US011546030B2

United States Patent
Lee et al.

(10) Patent No.: US 11,546,030 B2
(45) Date of Patent: Jan. 3, 2023

(54) METHOD AND APPARATUS FOR BEAM RECOVERY OF SINGLE/MULTI-BEAM PAIR LINK (BPL) IN MULTI-BEAM BASED SYSTEM

(71) Applicant: Samsung Electronics Co., Ltd., Suwon-si (KR)

(72) Inventors: Namjeong Lee, Suwon-si (KR); Jaewon Kim, Seoul (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/900,710

(22) Filed: Jun. 12, 2020

(65) Prior Publication Data

US 2020/0313742 A1    Oct. 1, 2020

Related U.S. Application Data

(63) Continuation of application No. 15/934,570, filed on Mar. 23, 2018, now Pat. No. 10,686,505.

(30) Foreign Application Priority Data

| Mar. 23, 2017 | (KR) | 10-2017-0037145 |
| May 4, 2017 | (KR) | 10-2017-0056937 |
| Jun. 15, 2017 | (KR) | 10-2017-0075722 |

(51) Int. Cl.
*H04L 12/28* (2006.01)
*H04B 7/06* (2006.01)
(Continued)

(52) U.S. Cl.
CPC ......... *H04B 7/0617* (2013.01); *H04B 7/0626* (2013.01); *H04B 7/0632* (2013.01);
(Continued)

(58) Field of Classification Search
CPC .. H04B 7/0617; H04B 7/0626; H04B 7/0632; H04B 7/0645; H04B 7/0695;
(Continued)

(56) References Cited

U.S. PATENT DOCUMENTS

| 5,384,463 A | 1/1995 | Honjo et al. |
| 9,900,891 B1 | 2/2018 | Islam et al. |

(Continued)

FOREIGN PATENT DOCUMENTS

| KR | 10-2016-0055086 A | 5/2016 |
| WO | 2017/003172 A1 | 1/2017 |

(Continued)

OTHER PUBLICATIONS

International Search Report dated Jun. 22, 2018 in connection with International Patent Application No. PCT/KR2018/003487.

(Continued)

*Primary Examiner* — Phuongchau Ba Nguyen

(57) ABSTRACT

A communication method and system for converging a fifth generation (5G) communication system for supporting higher data rates beyond a fourth generation (4G) system with a technology for Internet of things (IoT) are disclosed. The communication method and system may be applied to intelligent services based on the 5G communication technology and the IoT-related technology, such as smart home, smart building, smart city, smart car, connected car, health care, digital education, smart retail, security and safety services. A method of a terminal for selecting a candidate beam in a wireless communication system is disclosed. The method includes receiving information on a reference signal from a base station, measuring a plurality beams based on the information on the reference signal, and determining at
(Continued)

least one candidate beam among the plurality beams, the candidate beam comprising a beam quality above a threshold.

20 Claims, 21 Drawing Sheets

(51) Int. Cl.
    *H04L 27/26*     (2006.01)
    *H04L 5/00*     (2006.01)

(52) U.S. Cl.
    CPC ......... *H04B 7/0645* (2013.01); *H04B 7/0695* (2013.01); *H04L 5/0053* (2013.01); *H04L 27/2657* (2013.01)

(58) Field of Classification Search
    CPC ... H04L 5/0053; H04L 27/2657; H04L 47/10; H04L 43/50; H04L 12/2697; H04L 43/0852; H04L 43/00
    See application file for complete search history.

(56) References Cited

U.S. PATENT DOCUMENTS

| | | | |
|---|---|---|---|
| 10,686,505 B2* | 6/2020 | Lee | H04L 27/2657 |
| 10,700,752 B2* | 6/2020 | Jung | H04W 74/006 |
| 10,951,355 B2* | 3/2021 | Zhou | H04B 7/0626 |
| 2015/0382205 A1 | 12/2015 | Lee et al. | |
| 2016/0119043 A1 | 4/2016 | Rajagopal et al. | |
| 2016/0142189 A1 | 5/2016 | Shin et al. | |
| 2018/0109303 A1 | 4/2018 | Yoo et al. | |
| 2018/0206170 A1* | 7/2018 | Nagaraja | H04W 16/28 |
| 2018/0227899 A1* | 8/2018 | Yu | H04B 7/02 |
| 2018/0278467 A1* | 9/2018 | John Wilson | H04W 72/046 |
| 2018/0323856 A1* | 11/2018 | Xiong | H04L 1/16 |
| 2018/0368126 A1* | 12/2018 | Islam | H04L 5/0053 |
| 2019/0058517 A1 | 2/2019 | Kang et al. | |
| 2020/0059398 A1* | 2/2020 | Pan | H04W 72/0413 |
| 2020/0145091 A1* | 5/2020 | Luo | H04W 24/10 |
| 2020/0322035 A1* | 10/2020 | Shi | H04B 7/0639 |
| 2020/0382196 A1* | 12/2020 | Mohandoss | H04B 7/0695 |
| 2021/0067160 A1* | 3/2021 | Zhao | H03K 17/943 |

FOREIGN PATENT DOCUMENTS

| | | | | |
|---|---|---|---|---|
| WO | 2017024516 A1 | 2/2017 | | |
| WO | 2018/128384 A1 | 7/2018 | | |
| WO | WO-2021030762 A1 * | 2/2021 | ........... | H04B 7/0695 |

OTHER PUBLICATIONS

Huawei et al., "Configuration of CSI-RS for beam management", 3GPP TSG RAN WG1 Meeting #88, Feb. 13-17, 2017, 6 pages, R1-1701689.
Huawei et al., "Multi-beam Paging for NR", 3GPP TSG RAN WG1 Meeting #88, Feb. 13-17, 2017, 4 pages, R1-1701723.
Nokia et al., "Multi-beam control channel transmission", 3GPP TSG RAN WG1 #88, Feb. 13-17, 2017, 6 pages, R1-1703167.
Kang et al., WO 2018/128384 A1, Beam Information Reporting Method for Multi-User MIMO Transmission in Wireless Communication System and Apparatus Therefor, 2018, English Machine Translation, pp. 1-41 (Year: 2018).
ZTE et al., "Discussion on beam recovery mechanism", 3GPP TSG RAN WG1 Meeting #88, Feb. 13-17, 2017, R1-1701803, 6 pages.
Nokia et al., "Beam Recovery in NR", 3GPP TSG RAN WG1 NR Ad-Hoc Meeting, Jan. 16-20, 2017, R1-1701092, 5 pages.
MediaTek Inc., "Aspects for UE-initiated beam recovery", 3GPP TSG RAN WG1 Meeting #88, Feb. 13-17, 2017, R1-1702730, 5 pages.
Samsung, "NR beam recovery", 3GPP TSG-RAN WG2 2017 RAN2#98 Meeting, May 15-19, 2017, R2-1705731, 5 pages.
Supplementary European Search Report dated Apr. 7, 2020 in connection with European Patent Application No. 18 77 0720, 15 pages.
Office Action dated Jun. 2, 2021, in connection with Korean Application No. 10-2017-0075722, 10 pages.
Qualcomm Incorporated, "Beam Recovery Procedures," R1-1702606, 3GPP TSG-RAN WG1 #88, Athens, Greece, Feb. 13-17, 2017, 8 pages.
Korean Intellectual Property Office (KIPO), "Notification of a Decision to Grant" dated Nov. 1, 2021, in connection with counterpart Korean Patent Application No. 10-2017-0075722, 7 pages.
NTT Docomo, Inc., "Views on mechanism to recover from beam failure", 3GPP TSG RAN WG1 Meeting #88, R1-1702799, Athens, Greece, Feb. 13-17, 2017, 4 pages.
Qualcomm et al., "Signaling for recovery from beam failure", 3GPP TSG RAN WG1 Meeting #88, 3GPP R1-1703555, Athens, Greece, Feb. 13-17, 2017, 4 pages.
China National Intellectual Property Administration, "Notification of the First Office Action," dated Nov. 2, 2022, in connection with Chinese Patent Application No. 201880020220.7, 18 pages.

* cited by examiner

METHOD AND APPARATUS FOR BEAM RECOVERY OF SINGLE/MULTI-BEAM PAIR LINK (BPL) IN MULTI-BEAM BASED SYSTEM

CROSS-REFERENCE TO RELATED APPLICATIONS

This application is a continuation of U.S. patent application Ser. No. 15/934,570 filed on Mar. 23, 2018, which is based on and claims priority under 35 U.S.C. § 119 to Korean Patent Application No. 10-2017-0037145 filed on Mar. 23, 2017, Korean Patent Application No. 10-2017-0056937 filed on May 4, 2017, and of a Korean Patent Application No. 10-2017-0075722 filed on Jun. 15, 2017 in the Korean Intellectual Property Office, the disclosures of which are herein incorporated by reference in their entirety.

BACKGROUND

1. Field

The disclosure relates to a procedure of a base station and a terminal for a beam recovery when a single/multi-beam pair link (BPL) for transmission or reception on a control channel is monitored in a beamforming system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Recent developments in LTE and LTE-Advanced have led to active research into a technique for operating a single/multi-beam pair link (BPL) in a multi-beam based system. For example, it is necessary to study the operation of the base station and the terminal for beam recovery in the case of operating a single/multi-BPL in a multi-beam based system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a procedure of a base station and a terminal for a beam recovery when a single/multi-beam pair link (BPL) for transmission or reception on a control channel is monitored.

The beam recovery method according to the embodiment of the present disclosure defines a beam recovery operation of a base station and a terminal when a single/multi-BPL for transmission and reception on a control channel is monitored in a multi-beam based system.

In accordance with a first aspect of the present disclosure, a method of a terminal for selecting a candidate beam in a wireless communication system is disclosed. The method includes receiving information on a reference signal from a base station, measuring a plurality beams based on the information on the reference signal, and determining at least one candidate beam among the plurality beams, the candidate beam comprising a beam quality above a threshold.

In accordance with a second aspect of the present disclosure, a method of a base station for selecting a candidate beam in a wireless communication system is disclosed. The method includes identifying reference signals configuring a resource set for measuring a plurality of beams beam quality, and transmitting information on the reference signals resource set to a terminal.

In accordance with a third aspect of the present disclosure, a terminal for selecting a candidate beam in a wireless communication system is disclosed. The terminal includes a receiver configured to receive a signal from a base station, and a processor. The processor is configured to control the receiver to receive information on a reference signal from the base station, measure a plurality beams based on the information on the reference signal, and determine at least one candidate beam among the plurality beams, the candidate beam comprising a beam quality above a threshold.

In accordance with a fourth aspect of the present disclosure, a base station for selecting a candidate beam in a wireless communication system. The terminal includes a transmitter configured to transmit a signal to a terminal, and a processor configured to identify reference signals for measuring a plurality of beams, and control the transmitter to transmit information on the reference signals to the terminal.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
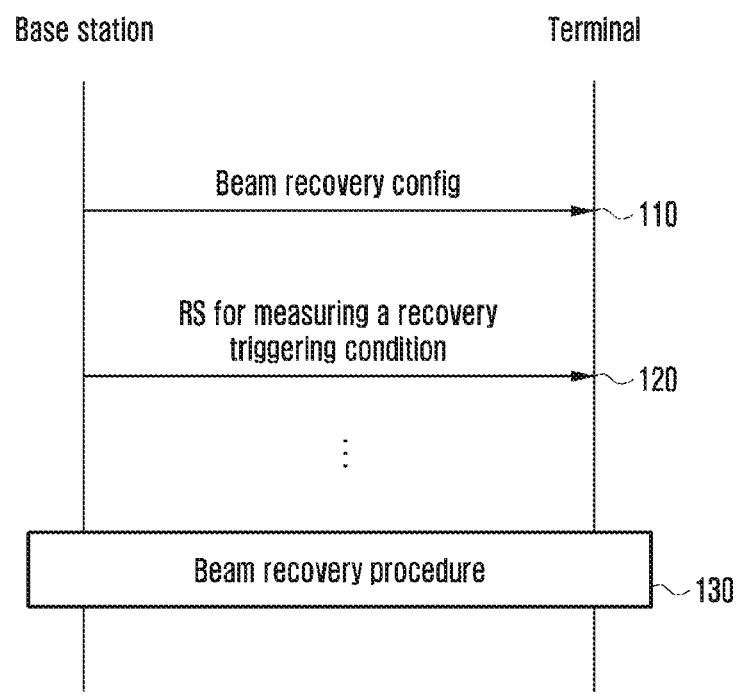
FIG. 1 shows a procedure of a base station and a terminal for beam recovery.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as examples only. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

In a multi-beam based system, a beam pair link (BPL) for transmission on a downlink (DL) and uplink (UL) control/data channel between a base station and a terminal can be specified. The BPL may refer to a beam pair between the base station and the terminal for a composite beam (or wide beam) or a fine beam (or narrow beam) selected based on a beam management reference signal (RS). The BPL used for a control channel transmission and the BPL used for a data channel transmission in one terminal may be different from each other. In addition, according to a beam correspondence in the base station and the terminal, the transmission/reception beam direction of the base station and/or the transmission/reception beam direction of the terminal for UL and DL communication configuring the BPL between the base station and the terminal may be specified differently. In addition, the system may monitor a plurality of BPLs for control/data channel transmission for robust beam management. In particular, an operation of a plurality of BPLs for the control channel makes it possible for a terminal to not lose BPLs which can communicate.

If the single/multi-BPL between the base station and the terminal is not available (i.e., a beam failure state), the terminal is in a state in which it has lost a beam link capable of communicating with the base station even if it is synchronized with the network. Therefore, beam recovery is performed to obtain a new BPL. The terminal may recognize a beam failure. The terminal performs continuous measurement using a reference signal (RS) configured through a master information block (MIB)/secondary information block (SIB) (or minimum system information (SI)) or RRC signaling from the base station, thereby finding a beam failure. For example, when a value measured using the RS drops below a predetermined threshold, the terminal may recognize a failure of the corresponding BPL (at least DL BPL). The RRC may include cell-specific or UE-specific RRC. The RS for a beam failure detection may be cell-specific, UE-specific or UE-group-specific. For example, the beam failure detection RS may be a synchronization signal. The synchronization signal can be associated with composite beams or a wide beam which consists of several narrow beams. In another example, the beam failure detection RS may be an RS mapped to each of the entire fine beams or narrow beams that the base station uses to cover the entire service area. The fine beam or the narrow beam refers to the beam used by the base station for transmission on a control channel and/or a data channel to the terminal.

FIG. 1 shows a procedure of a base station and a terminal for beam recovery.

Referring to FIG. 1, the base station transmits information on a beam recovery configuration to a terminal along with information on a configuration for a beam failure detection RS at operation 110. The information on the beam recovery configuration may include parameters for resource, sequence, and a metric operation. For example, the base station may transmit, to the terminal, a configuration (e.g., frequency/time information) for resources capable of performing beam recovery, the sequence for performing the beam recovery, and the parameters (e.g., threshold) to be able to be used to detect the beam failure. The sequence for performing beam recovery may be dedicatedly allocated to the terminal or redundantly allocated to many terminals.

The base station transmits the RS for measuring a beam triggering condition to the terminal at operation 120. Thereafter, the base station and the terminal perform a beam recovery procedure based on i) a recovery request, or ii) a BPL(s) update at operation 130.

Hereinafter, embodiments of operations of a base station and a terminal for beam recovery in various situations will be described.

Operation of Base Station/Terminal According to Recovery Resource

If there is a changeable alternate BPL after detecting the beam failure for a specific BPL(s), the terminal may transmit a beam recovery request to the base station. Since the previously used BPL(s) is no longer available, the terminal may not transmit a beam recovery request (RR) on the UL control channel or the data channel communicating with the previously used BPL(s). In a region in which the base station sweeps multi-beam across all directions of a service area, like a random access channel (RACH) resource to which an initial access terminal is allocated to perform random access (RA), the terminal may perform RR. In the system in which the beam correspondence with a base station is established, the terminal may transmit an RR message to the base station based on the preferred beam information acquired through the beam management RS, using the resources for RR in which the corresponding beam performs the reception. The beam management RS may be the same as or different from the beam failure detection RS.

Case 1) Use of Resource Other than RACH for Recovery: Sharing Resources for Recovery/Scheduling Request (SR)

Resources other than the frequency/time/sequence resources (i.e., RACH) defined for the terminal performing the RA may be used for the beam recovery. The frequency/time/sequence resources defined for the RR may be a resource that is also allowed to transmit the SR. The frequency and time resources are shared for the RR and the SR, but embodiments of various alternatives depending on how to allocate the sequence are described in detail below.

Alt 1. Allocate Respective Sequence Dedicated for RR and SR to Each Terminal (Non-Contention Based Recovery/SR)

A respective sequence dedicated for each RR and SR may be allocated to each terminal. In this alternative, it is possible to perform RR and SR without contention among many users even if all the frequency/time resources for the RR and the SR are shared.

Figure 2:
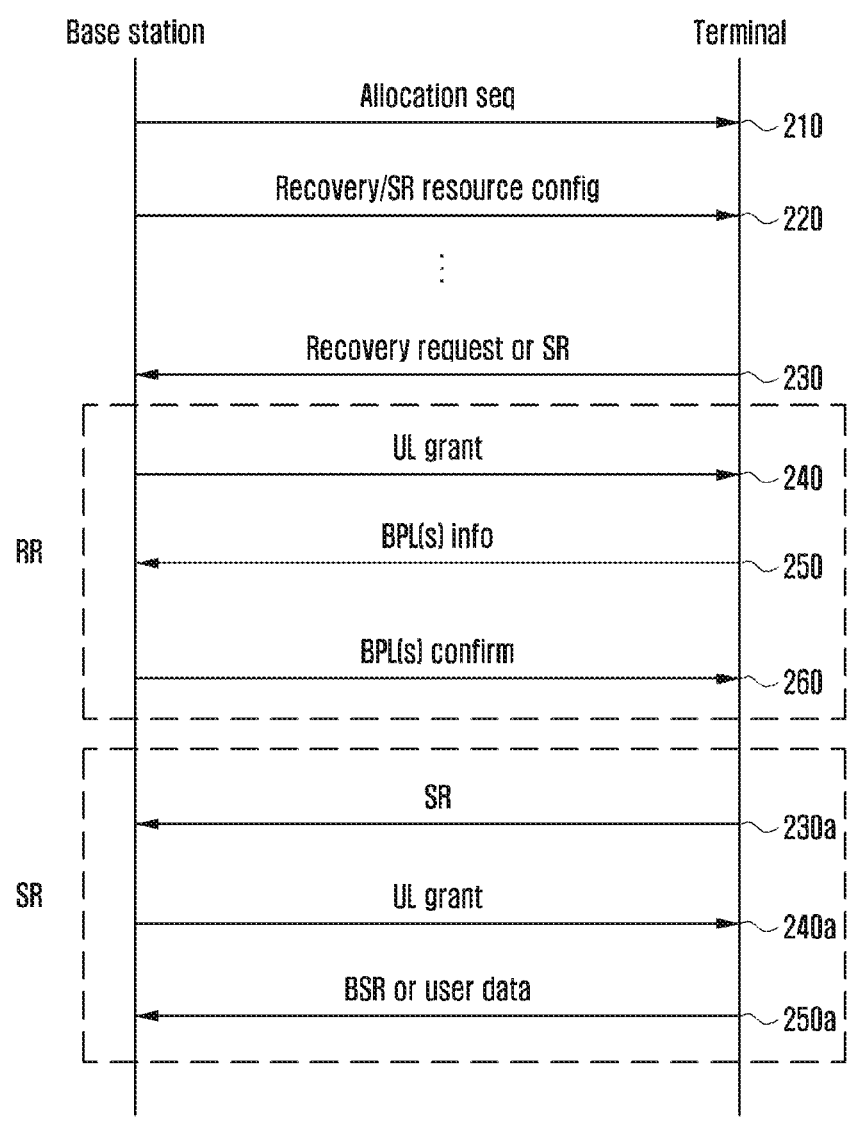
FIG. 2 shows a procedure of a base station and a terminal when a respective sequence dedicated for each RR and SR is allocated to each terminal and the beam correspondence is satisfied in the base station/terminal according to an embodiment of the present disclosure.

FIG. 2 shows a procedure of a base station and a terminal when a respective sequence dedicated for each RR and SR is allocated to each terminal and the beam correspondence is satisfied in the base station/terminal according to an embodiment of the present disclosure.

Referring to FIG. 2, the base station allocates the dedicate sequence for the RR and the SR to the terminal through the Msg 4 during the RA process at the terminal initial connection or through the UE-specific RRC signaling at operation 210. Thereafter, the base station transmits information on the resource configuration necessary for the RR and the SR through the RRC signaling at operation 220.

Thereafter, the terminal may transmit RR in the RR/SR resource using the allocated RR sequence at operation 230. The base station receiving the request may transmit UL grant at operation 240. At this time, it is possible to trigger reporting on the preferred BPL information that the terminal updates through the UL grant. In addition, the base station may indicate the number of preferred BPLs to be reported to the terminal. Thereafter, the terminal may report the information on the BPL(s) to be updated through uplink control information (UCI) or media access control-control element (MAC-CE) at operation 250. This information may include a beam (or BPL) ID, a port number for the beam management RS, information on reference signal received power (RSRP) for the corresponding beam (or BPL), and so on. Thereafter, the base station transmits the confirmation information for the newly designated BPL(s) at operation 260. If the newly designated BPL(s) is recognized, from the point, the base station and the terminal start to communicate using the newly designated BPL(s) instead of the existing BPL(s) established between the base station and the terminal. If the RR resource and each BPL are associated (that is, if the preferred BPL may be determined according to whether the terminal transmits the RR using which location (e.g., OFDM symbol) of the RR resources), or if the base station operates only the single BPL for the terminal, transmitting the UL grant by the base station and reporting of the information on the BPL (s) to be updated by the terminal of FIG. 2 may be omitted.

Alternatively, the terminal may transmit the SR in the RR/SR resources using the allocated SR sequence at operation 230a. The base station receiving the SR transmits the UL grant to the corresponding terminal at operation 240a. The terminal may transmit a buffer status report (BSR) through the MAC-CE or transmit data if the amount of data is very small at operation 250a.

This embodiment may be applied to a case where the same sequence is allocated to the terminal for the SR and RR and dedicated frequency/time resources to be used for transmission of the SR and RR are separately divided and allocated within an interval pre-defined to be used for the SR and RR. At this time, the base station will allocate the dedicated frequency/time resources instead of transmitting information on the allocation of the dedicated sequence to the terminal.

Alt 2. Allocate Single Sequence Dedicated for and SR to Each Terminal (Non-Contention Based Recovery/SR)

The system may allocate a common dedicated sequence for the RR and the SR to each terminal. In this alternative, since the base station receiving the common dedicated sequence for the RR/SR from the terminal does not clearly know whether the intention of the terminal corresponds to the RR or the SR, the terminal needs to clarify the intention.

Figure 3:
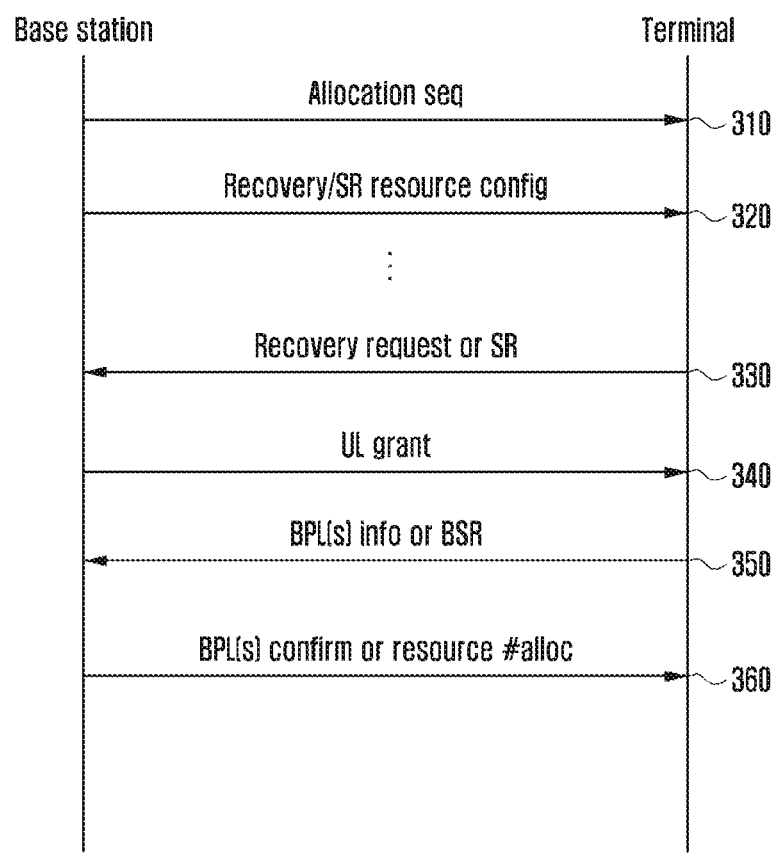
FIGS. 3 and 4 show procedures of a base station and a terminal when a single dedicated sequence for RR and SR is allocated to each terminal and the beam correspondence is satisfied in the base station/terminal according to embodiments of the present disclosure.
Figure 4:
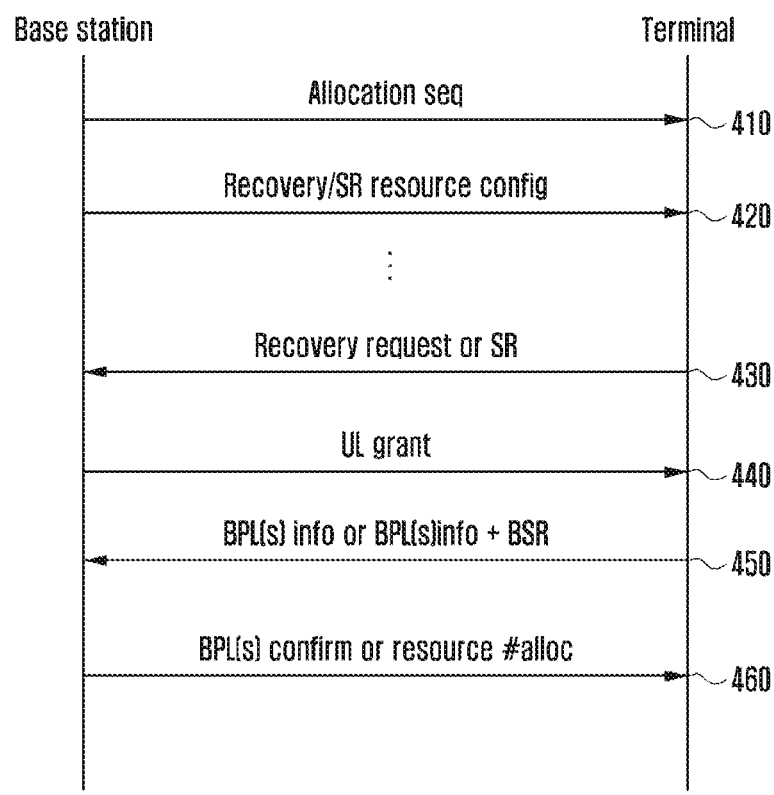

FIGS. 3 and 4 show procedures of a base station and a terminal when a single dedicated sequence for RR and SR is allocated to each terminal and the beam correspondence is satisfied in the base station/terminal according to embodiments of the present disclosure.

Referring to FIGS. 3 and 4, the base station allocates the single sequence for the RR and the SR to the terminal through the Msg 4 during the RA process at the terminal initial connection or through the UE-specific RRC signaling at operations 310 and 410. Thereafter, the base station transmits information on the resource configuration necessary for the RR and the SR to the terminal through the RRC signaling at operations 320 and 420. Thereafter, when the terminal desires to perform the RR or the SR, the terminal transmits the RR or the SR in the resources for the RRs and SR using the allocated sequence at operations 330 and 430. Thereafter, the base station transmits the UL grant to the terminal at operation 340 and 430. Referring to FIG. 3, the terminal to perform the RR may transmit the information on the new BPL(s) using the MAC-CE, and the terminal to perform the SR may transmit BSR or data at operation 350. As described above, the information on the new BPL(s) may include a beam (or BPL) ID, a port number for the beam management RS, information on RSRP for the corresponding beam (or BPL), and so on. Since the BPL(s) information or the BSR will be formatted and divided, the base station may clearly know the purpose of the request sequence through the MAC-CE of the terminal. When it is determined that the terminal transmitted the sequence for the RR through the MAC-CE at operation 330, the base station may confirm the information on the updated BPL(s) at operation 360, whereas when it is determined that the terminal transmitted the sequence for the SR through the MAC-CE at operation 330, the base station may allocate the resources for the terminal to transmit data at operation 360. Referring to FIG. 4, the terminal to perform the RR may transmit BPL(s) information, or the BSR along with BPL(s) information through a UCI at operation 450. If the terminal transmits only BPL(s) information, the base station may determine that the terminal transmitted the sequence for the RR. If the terminal transmits the BSR or the BPL(s) information along with the BSR, it may determine that the terminal transmitted the sequence for the SR. Similar to the embodiment of FIG. 3, the base station may confirm the information on the updated BPL(s) or allocate the resources for the terminal to transmit data according to the determining of whether the terminal transmitted the sequence for the RR or SR at operation 460.

This embodiment may be applied to a case where the same sequence is allocated to the terminal for the SR and RR and the same dedicate frequency/time resources to be used for transmission of the SR and RR are allocated within an interval pre-defined to be used for the SR and RR. At this time, the base station will allocate the dedicate frequency/time resources instead of allocating the dedicate sequence to the terminal.

Alt 3. Allocate Dedicated Sequence for Either RR or SR to Each Terminal Alt 3-1. Allocate Dedicated Sequence for SR+not Allocate Dedicated Sequence for RR (Contention Based Recovery)

Figure 5:
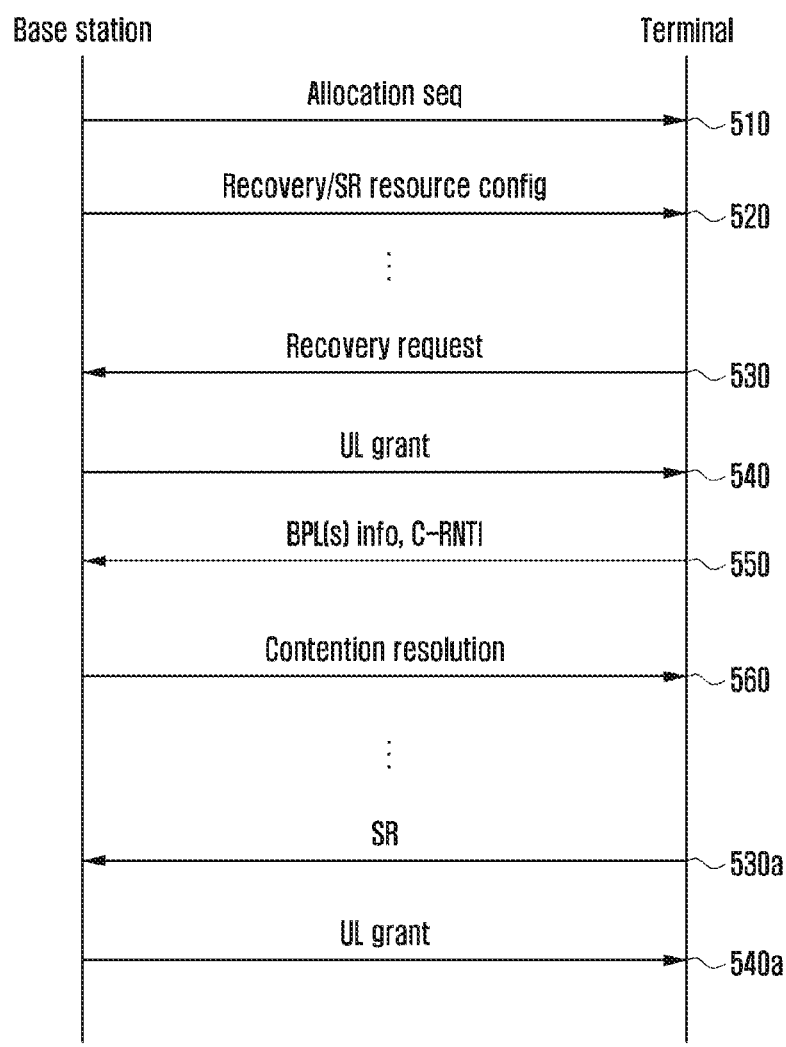
FIG. 5 shows a procedure of a base station and a terminal when the dedicated sequence is allocated for the SR but is not allocated for the RR and the beam correspondence is satisfied in the base station/terminal according to an embodiment of the present disclosure.

The system may allocate the dedicated sequence to each terminal for the SR and not allocate the dedicated sequence for recovery. In this alternative, the sequences available for the RR and SR should be divided into two sets, i.e., a set for the RR or a set for the SR. That is, one sequence is included only in one set of two sets. The SR sequence dedicatedly allocated to the terminal is selected from the sequence set for the SR, and all terminals in the cell may select a sequence at random from the sequence set for the RR and use the selected RR sequence. In addition, in this case, even if the frequency/time resources for the RR and the SR are the same, contention does not occur between the terminals for the SR and the RR. FIG. 5 shows a procedure of a base station and a terminal when the dedicated sequence is allocated for the SR but is not allocated for the RR and the beam correspondence is satisfied in the base station/terminal according to an embodiment of the present disclosure.

Referring to FIG. 5, the base station selects and allocates the SR sequence from the sequence set for the SR through the Msg 4 at the terminal initial access or the UE-specific RRC at operation 510. As described above, the sequence set is divided into the set for the SR and the set for the RR. Thereafter, the base station transmits information on the resource configuration necessary for the RR and the SR to the terminal through the RRC signaling at operation 520. Thereafter, the terminal selects a sequence randomly among the sequence set for the RR and performs the RR at operation 530. The base station transmits the UL grant for the RR at operation 540. The DCI for receiving the corresponding UL grant is scrambled with a specific radio network temporary identifier (RNTI). This particular RNTI may be related to the RR sequence used by the terminal. The UL grant may include information on the number of BPLs. The terminal receiving the UL grant transmits new BPL(s) information to be updated and C-RNTI on a physical uplink shared channel (PUSCH) at operation 550. The terminal already has the C-RNTI since the terminal is connected to the network. Therefore, since it is possible that there is a user using the same RR sequence and resources, the C-RNTI may be transmitted for performing contention resolution. Thereafter, the base station transmits the BPL(s) confirmation information to the terminal along with the contention resolution message at operation 560.

Alternatively, the terminal may transmit the SR to the base station using the sequence allocated for the SR at operation 530a. For example, the terminal may use MSG1 for transmission of the SR. The base station receiving the SR transmits the UL grant to the terminal at operation 540a.

This embodiment may be applied to a case where the same sequence is allocated to the terminal for the SR and RR, and the dedicate frequency/time resources to be used for the transmission of the SR are separately allocated within the interval pre-defined for the SR and RR, but the dedicate frequency/time resources to be used for the transmission of the RR are not allocated and the terminal randomly selects the resources for the RR to transmit the RR. At this time, the base station needs to give information on whether the areas for the SR and RR are separately divided in the area initially designated for the SR and RR.

Alt 3-2. Allocate Dedicated Sequence for RR+not Allocate Dedicated Sequence for SR (Contention Based SR)

Figure 6:
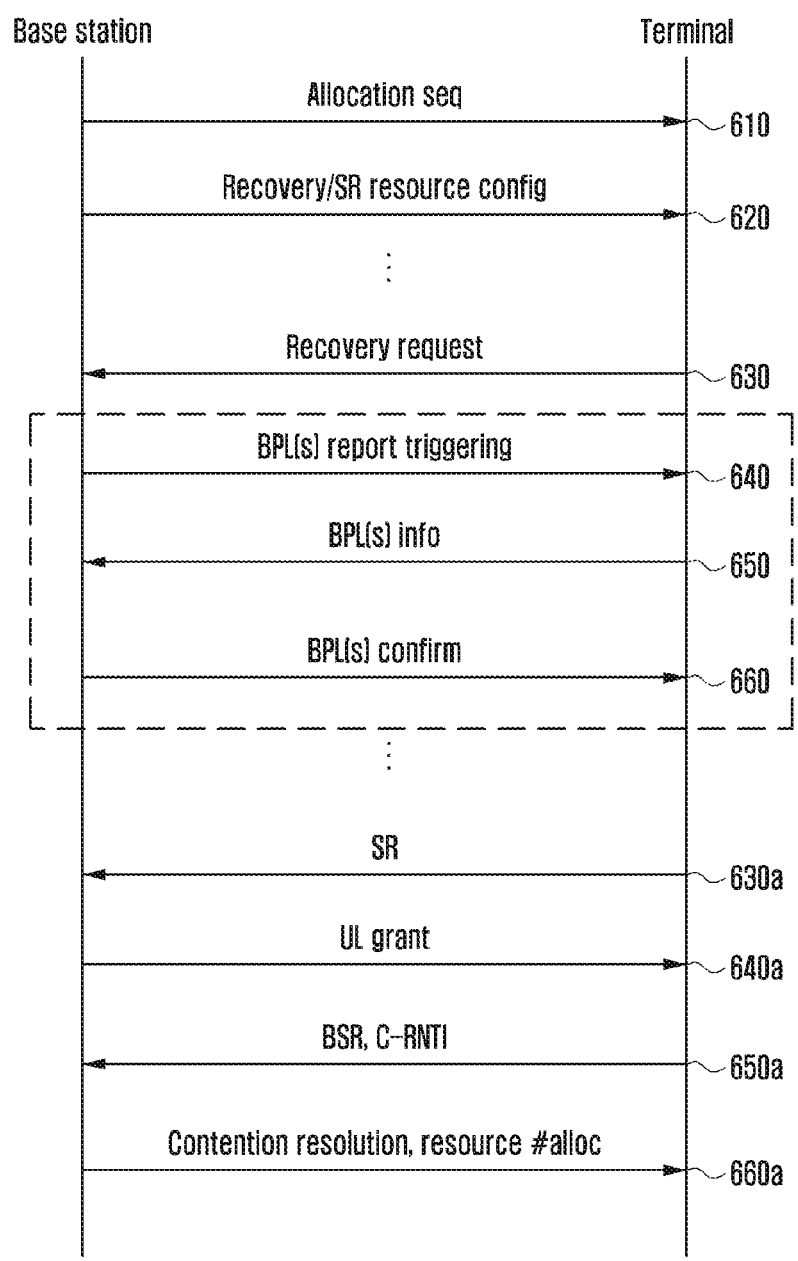
FIG. 6 shows a procedure of a base station and a terminal an embodiment when the dedicated sequence is allocated for the RR but is not allocated for the SR and the beam correspondence is satisfied in the base station/terminal according to an embodiment of the present disclosure.

The system may allocate the dedicated sequence to each terminal for the RR and not allocate the dedicated sequence for the SR. In this alternative, the sequences available for the RR and SR should be divided into two sets, i.e., a set for the RR or a set for the SR. That is, one sequence is included only in one set of two sets. The RR sequence dedicatedly allocated to the terminal is selected from the sequence set for the RR, and all terminals in the cell may select a sequence at random from the sequence set for the SR and use the selected SR sequence. In addition, in this case, even if the frequency/time resources for the RR and the SR are the same, contention does not occur between the terminals for the SR and the RR. FIG. 6 shows a procedure of a base station and a terminal when the dedicated sequence is allocated for the RR but is not allocated for the SR and the beam correspondence is satisfied in the base station/terminal according to an embodiment of the present disclosure.

Referring to FIG. 6, the base station selects and allocates the RR sequence from the sequence set for the RR through the Msg 4 at the terminal initial access or the UE-specific RRC at operation 610. As described above, the sequence set is divided into the set for the SR and the set for the RR. Thereafter, the base station transmits information on the resource configuration necessary for the RR and the SR to the terminal through the RRC signaling at operation 620. Thereafter, the terminal selects a sequence randomly among the sequence set for the SR and performs the SR at operation 630*a*. The base station transmits the UL grant for the SR at operation 640*a*. The DCI for receiving the corresponding UL grant is scrambled with a specific RNTI. This particular RNTI may be is related to the SR sequence used by the terminal. The terminal receiving the UL grant transmits BSR information and C-RNTI on the PUSCH at operation 650*a*. The terminal already has the C-RNTI while being connected to the network. Therefore, if there is a user using the same SR sequence at the location in the same SR resource, the C-RNTI is transmitted for the purpose of performing contention resolution. Thereafter, the base station allocates resources for the terminal to transmit the UL data together with the contention resolution message at operation 660*a*.

This embodiment may be applied to a case where the same sequence is allocated to the terminal for the SR and RR, and the dedicate frequency/time resources to be used for transmission of the RR are separately allocated within the interval pre-defined for the SR and RR, but the dedicate frequency/time resources to be used for transmission of the SR are not allocated and the terminal randomly selects the resources for the SR to transmit the SR. At this time, the base station needs to give information on whether the areas for the SR and RR are separately divided in the area initially designated for the SR and RR.

Case 2) When Using RACH Resource for Recovery

In the system, the same frequency/time/sequence resources can be used for the RA for the initial access terminals and the RR. In this case, the terminal clarifies whether the terminal requests the RR or the terminal is an initial access terminal through the DCI or the MAC-CE in Msg 3, similar to the embodiment of the Alt 2 (FIGS. 3 and 4) of Case 1.

Operation of Base Station/Terminal According to Beam Failure Detection RS

In order to select the BPL between the base station and the terminal, the terminal may select a rough beam (composite beam or wide beam) using the synchronization signal, or select a fine beam based on the RS corresponding to the fine beam or narrow beam used when the base station performs transmission on the data channel and the control channel. This may be changed according to the operation of the base station.

Case 1) When Periodic DL Beam Management RS (Cell-Specific or UE-Specific) Capable of Fine Beam Association is Transmitted If the DL beam management RS capable of selecting the fine beam is periodically transmitted, the terminal may monitor the BPL(s) which can be changed through the RS when the beam failure continuously occurs. If the beam correspondence is established in the base station/terminal, the operation of the base station/terminal can be performed such as the alternatives above-mentioned in the "operation of the base station/terminal based on the recovery resource".

Case 2) When Periodic DL Beam Management RS (Cell-Specific or UE-Specific) Capable of Only Rough Beam Association is Transmitted, or when Periodic Beam Management RS is not Transmitted If the DL beam management RS capable of selecting the fine beam is not periodically transmitted or only the DL beam management RS capable of the rough beam association is periodically transmitted (for example, synchronization signal), the operation of the base station and the terminal different from the above-mentioned schemes should be defined. As the BPL for the control and/or data transmission established by the existing base station and terminal should be updated by the beam recovery request process, the channel state information-reference signal (CSI-RS) should be transmitted so that the preferred BPL(s) of the terminal in the beam recovery request process may be selected and reported. The BPL(s) may include the information on the fine beam.

Figure 7:
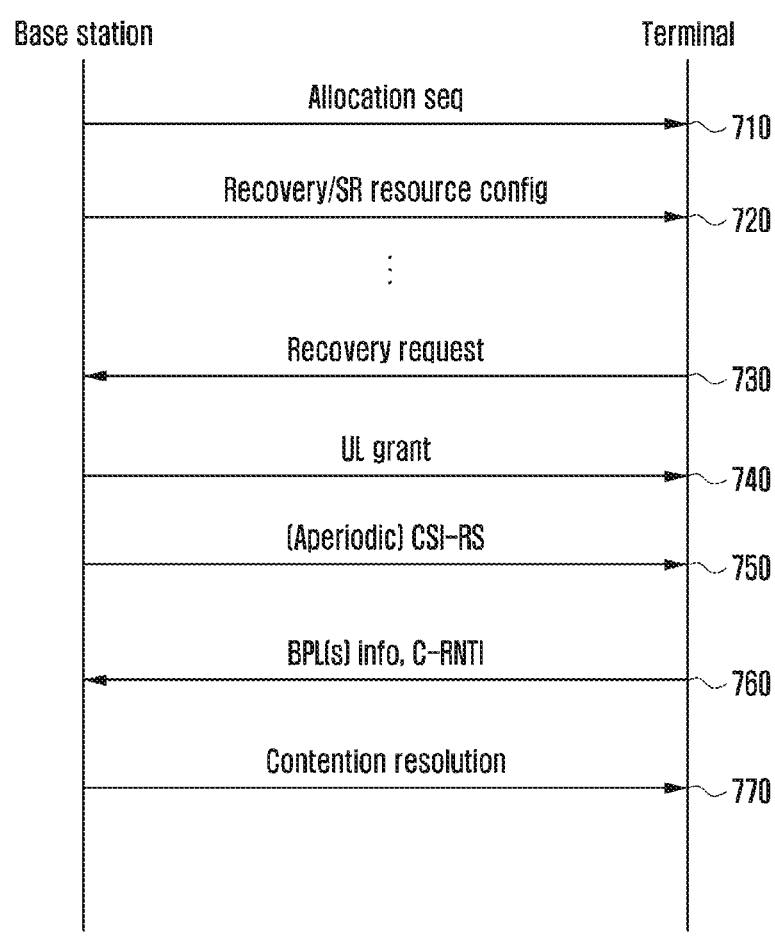
FIG. 7 shows an example of the RR procedure when the beam correspondence at the base station/terminal is established.

FIG. 7 shows an example of the RR procedure when the beam correspondence at the base station/terminal is established.

Referring to FIG. 7, the base station selects and allocates the SR sequence from the sequence set for the SR through the Msg 4 at the terminal initial access or the UE-specific RRC at operation 710. As described above, the sequence set is divided into the set for the SR and the set for the RR. Thereafter, the base station transmits information on the resource configuration necessary for the RR and the SR to the terminal through the RRC signaling at operation 720. Compared with the RR-related base station-terminal operation of FIG. 5, when the base station receives the RR from the terminal at operation 730, the base station can activate the CSI-RS transmission configured through the RRC when transmitting the UL grant at operation 740. The UL grant may include information on the number of BPLs. Upon performing the RR, the terminal may select the location in the resources for the RR corresponding to the BPL for the preferred rough beam obtained by using the synchronization signal or the like, which the base station transmits with the composite beam, such that the base station may find the rough beam that the terminal prefers based on the location within the resource for the RR in which the terminal performs the RR. Therefore, the transmission beam of the base station which is transmitted for the fine beam selection of the terminal in the corresponding CSI-RS resource may be the narrow beams configuring the corresponding rough beam. The base station transmits the activated (aperiodic) CSI-RS at operation 750 after the UL grant, and the terminal may select the port number(s) of the preferred CSI-RS through a PUSCH and reports the BPL(s) information including the selected port number(s), thereby updating the BPL in which the beam failure occurs at operation 760. In this case, FIG. 7 illustrates an embodiment of the system for operating the contention-based RR as shown in FIG. 5, wherein the terminal transmits the C-RNTI along with the selected BPL(s) information to help the base station perform the contention resolution at operation 770. The base station may transmit the beam confirmation information to the terminal along with the contention resolution message. FIG. 7 shows an example. In addition to the embodiment shown in FIG. 7, when the base station can find that the terminal transmitted the RR based on the sequence transmitted in the RR resource, the base station may include the operation of activating the CSI-RS when transmitting the UL grant after receiving the RR sequence.

In another embodiment of the present disclosure, the base station having received the RR does not include the CSI-RS activation information when transmitting the UL grant, and after the terminal reports the preferred rough beam through the DCI or the MAC-CE, the base station may activate the CSI-RS via the DCI (transmitted in the rough beam or the composite beam) and then the terminal selects a new BPL (with fine-beam) based on the CSI-RS.

Operation of Base Station/Terminal when Beam Correspondence is not Established at Base Station End The fact that the beam correspondence is not established at the base station end means that the beam direction used for DL signal transmission at the base station may not be the same as the beam direction used for the UL signal reception. In this case, the terminal can select the preferred DL transmission beam of the base station through the RS for the beam management. The RS for the beam management may refer to the synchronization signal transmitted through the composite beam or the RS capable of the fine beam association. However, since the terminal may not know through which reception beam the base station successfully receives the corresponding RR is successfully received when the RR is performed, the RR sequence should be transmitted from the resource location for the RR corresponding to the reception beam of the base station in all directions. If the terminal transmits the preferred DL transmission beam information of the base station when transmitting the RR, the base station may use the DL transmission beam in the corresponding direction when transmitting the response to the RR of the terminal later. There are two schemes of transmitting the preferred DL transmission beam information of the base station when the terminal transmits the RR. The first scheme includes the corresponding information in the sequence used at the time of the RR. The first scheme may be used when the sequence for the RR and SR or the time/frequency resources for the RR and the SR are separated. Alternatively, the first scheme can be available even when the sequence or the time/frequency resources for the RA and the RR is shared. The second scheme separates the resources according to the DL transmission beam of the base station within the resource for the RR. If the resource is configured as described above, the terminal may transmit the RR at the location corresponding to the preferred DL transmission beam of the base station within the resource for the RR to transmit the corresponding information to the base station.

As described above, when the beam correspondence is not established at the base station end, the transmission/reception beam directions for communicating with the terminal may be different. Therefore, the DL transmission beam for communicating with the specific terminal may be found when the terminal transmits the RR, but the process of finding the beam for receiving the corresponding information when the terminal transmits the UL information is required. Accordingly, the terminal is instructed to transmit the SRS during the beam recovery request process, and therefore a process of selecting, by the base station, the reception beam to be used at the time of receiving the UL signal that the corresponding terminal transmits is required.

Figure 8:
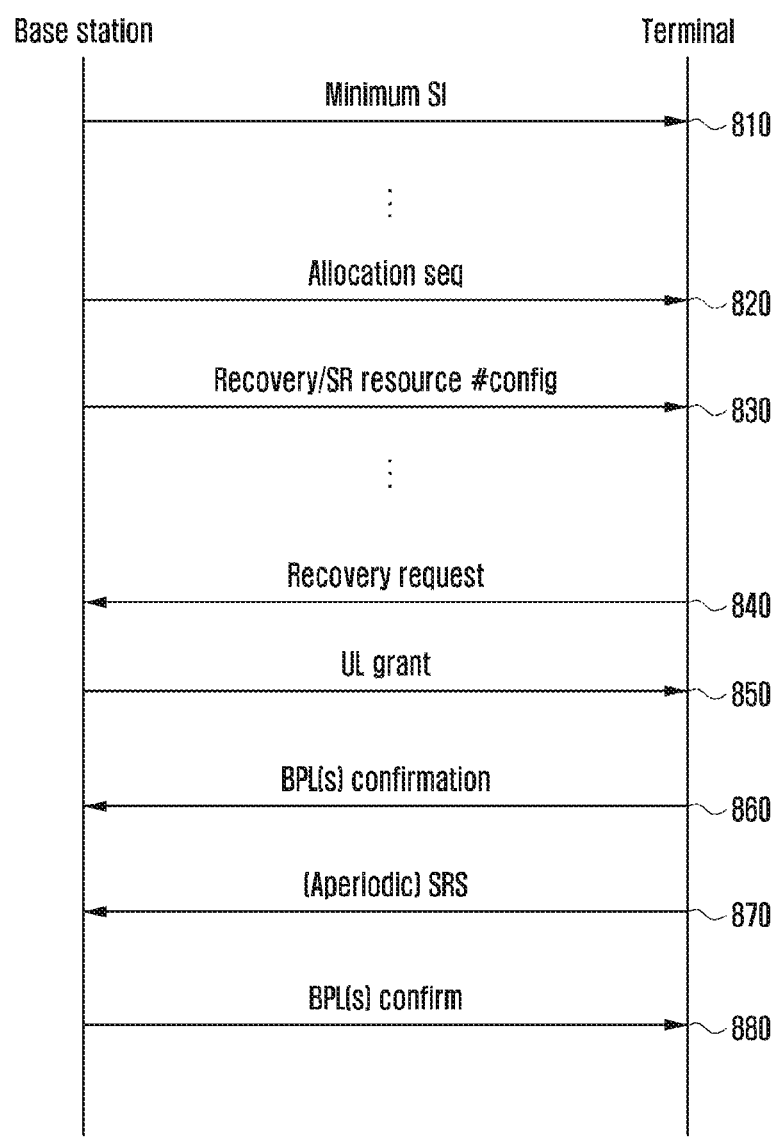
FIG. 8 shows an embodiment when the beam correspondence at the base station end is not established and the beam management RS for the fine beam association is periodically transmitted.

FIG. 8 shows an embodiment when the beam correspondence at the base station end is not established and the beam management RS for the fine beam association is periodically transmitted.

Referring to FIG. 8, the base station may inform the terminal whether the beam correspondence is established at the base station end through a minimum SI at operation 810. Thereafter, the base station allocates the sequence for the RR or the SR to the terminal through the Msg 4 during the RA process at the terminal initial connection or through the UE-specific RRC signaling at operation 820, and transmits information on the resource configuration necessary for the RR and the SR to the terminal through the (UE-specific) RRC signaling at operation 830. If the beam correspondence is not established, the base station receiving the RR at operation 840 may include the information on whether the base station DL transmission beam information that the terminal prefers is correct when the base station transmits the UL grant at operation 850 in order to select the beam for receiving the corresponding information when the terminal transmits the UL information, and may request the SRS transmission to the terminal. The UL grant may include information on the number of BPLs. After the terminal receiving the UL grant can confirm that the DL transmission beam included in the UL grant is correct through the UCI at operation 860, the terminal transmits the (aperiodic) SRS that the base station requests to select the beam for receiving the corresponding information when the terminal transmits the UL information of the terminal at operation 870. The base station may transmit the BPL(s) confirmation information to the terminal at operation 880.

FIG. 8 shows an example. In addition to the embodiment shown in FIG. 8, when the base station can find that the terminal transmitted the RR based on the sequence transmitted in the RR resource, the base station may include the operation of instructing the terminal to transmit the SRS when transmitting the UL grant after receiving the RR sequence.

Base Station/Terminal Operation in Multi-BPL Operation for Control Channel Transmission For the robust communication, it is possible to consider the system for monitoring the plurality of BPLs for transmitting the control channel between the base station and the terminal. This robust beam management can be applied to all terminals in the cell or only to some terminals.
Multi-Physical Downlink Control Channel (PDCCH) Monitoring Mode and Measurement Metric Selection The robust beam management scheme of the base station can be selected according to the number of beams that the terminal can simultaneously receive.

Figure 9:
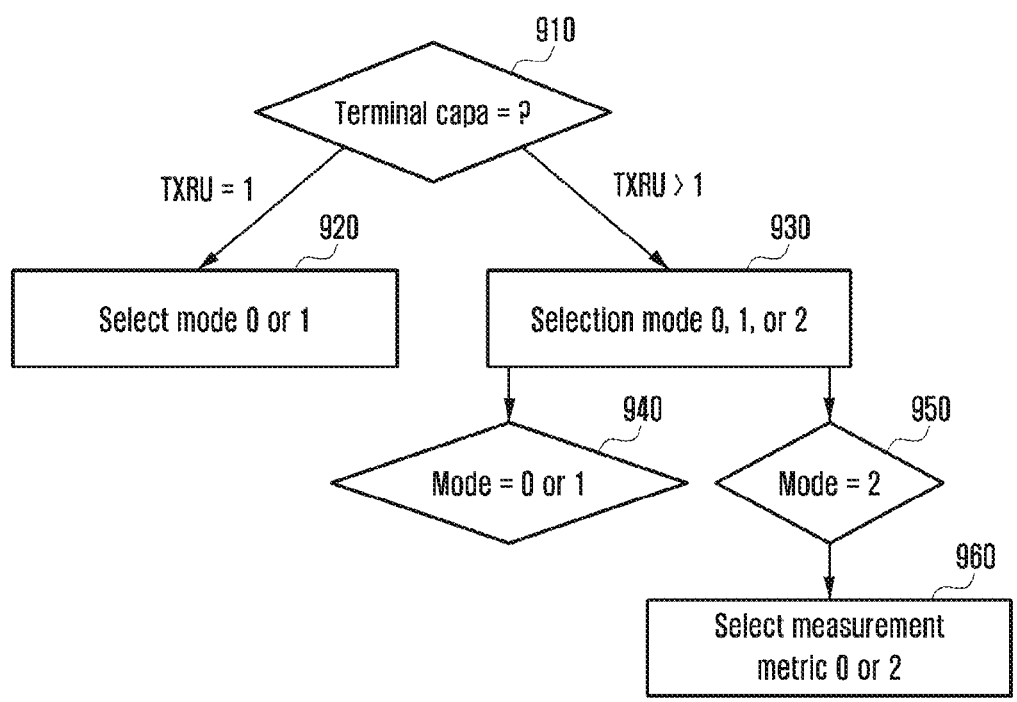
FIG. 9 shows an example of robust beam management mode selection according to the number of beams that the terminal can simultaneously receive.

FIG. 9 shows an example of robust beam management mode selection according to the number of beams that the terminal can simultaneously receive.

As shown in FIG. 9, if the terminal may receive only one beam at a time according to the information transmitted through capability negotiation (910) after the RA, the base station can select and allocate the robust beam management mode 0 or 1 to the terminal (920). Alternatively, if the terminal is capable of receiving multi-beam at a time, the base station may select and allocate one of the robust beam management modes 0/1/2 (930, 940, 950). In the robust beam management mode, the mode 0 is a mode in which the terminal receives one control beam at a time among the multi-BPLs, the mode 1 is a mode in which the terminal receives one beam at a time among the multi-BPLs but a candidate BPL which is being monitored is monitored at different frequencies, and the mode 2 is a mode in which the terminal receives beams corresponding to multi-BPLs at a time. In the mode 1, a plurality of monitoring BPLs is received at different OFDM symbols, and in the mode 2, the plurality of monitoring BPLs is received at one OFDM symbol. The terminal needs an operation of performing measurement based on a specific RS to distinguish the beam failure of the BPLs while the BPL associated with the robust beam management is monitored. In this case, the RS for the terminal to distinguish the beam failure may be the RS which corresponds to the synchronization signal (composite beam) including the beam through which the base station performs transmission on the control channel or the BPL associated with the beam through which the base station performs transmission on the control channel. In particular, in the case of the mode 2 (950), the scheme of calculating the above-described RS may be variously defined in order to distinguish the beam failure when the terminal performs the measurement, and this calculation scheme is called a measurement metric. For example, in the case of the mode 2 (950), measurement metric 0 or 2 may be selected (960).

Figure 10:
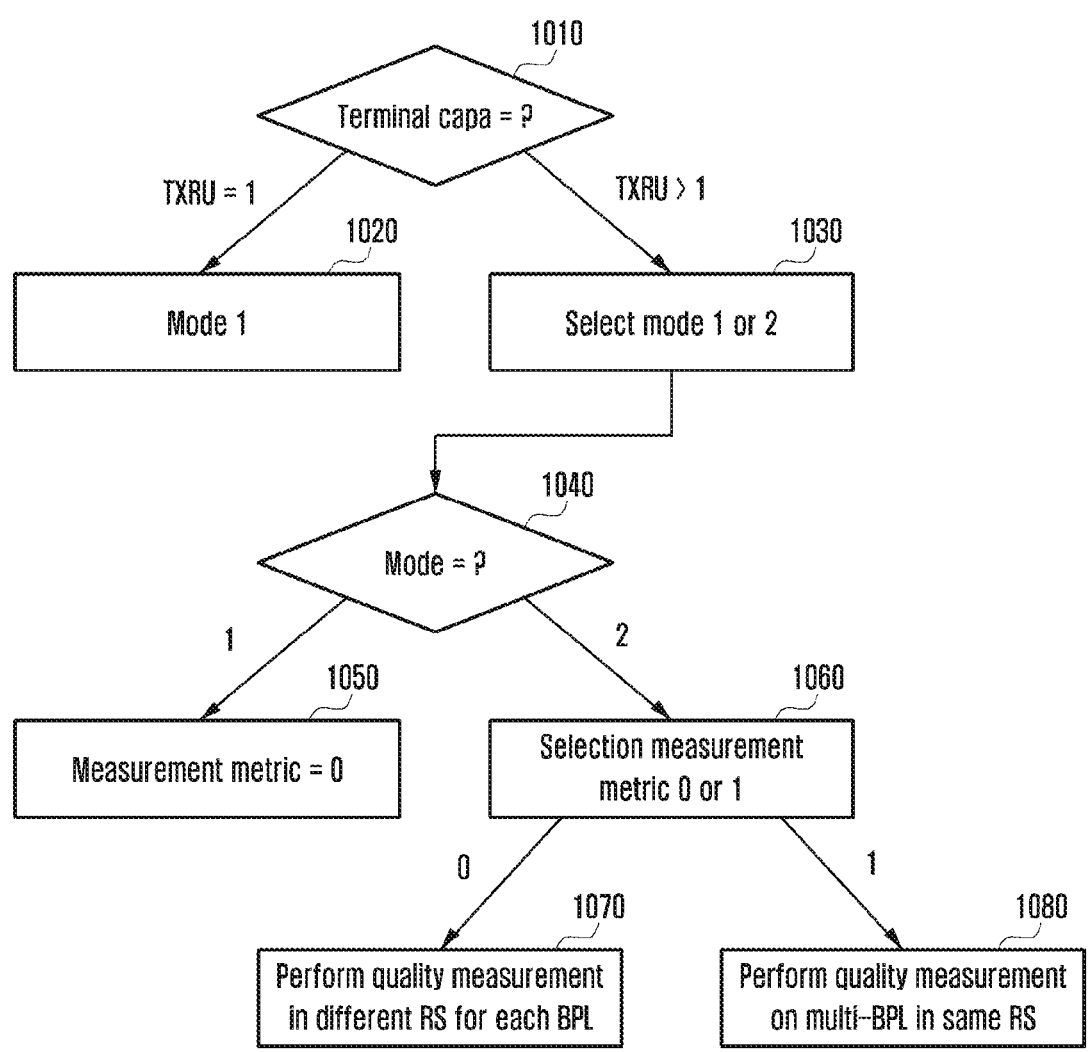
FIG. 10 shows an example of robust beam management mode selection and measurement metric selection according to the number of beams that the terminal can simultaneously receive.

FIG. 10 shows an example of robust beam management mode selection and measurement metric selection according to the number of beams that the terminal can simultaneously receive.

Referring to FIG. 10, if the terminal may receive only one beam at a time according to the information transmitted through capability negotiation (1010) after the RA, the base station can select and allocate the robust beam management mode 1 to the terminal (1020). Alternatively, if the terminal is capable of receiving multi-beam at a time, the base station may select and allocate one of the robust beam management modes 1 or 2 (1030). Based on whether mode 1 or 2 is selected (1040), the measurement metric is determined (1050, 1060). For example, the measurement metric 0 is configured for the terminal which drives the robust beam measurement mode 1 (1050), whereas the base station may designate the measurement metric 0 or 1 for the terminal which drives the robust beam measurement mode 2 (1060). The measurement metric 0 means performing the quality measurement in the single RS for each BPL (1070), and the measurement metric 1 means performing the quality measurement on the plurality of BPLs in the single RS (1080). According to another embodiment, the system can support only modes 1 and 2 except for mode 0. At this time, the mode 1 and 2 may be selected according to the terminal capability.

Figure 11:
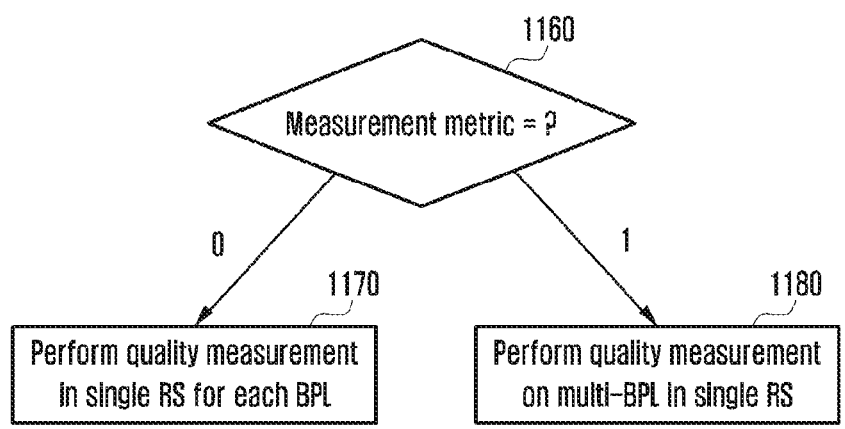
FIG. 11 shows a measurement metric selection in the case of the robust beam management mode 2.

FIG. 11 shows a measurement metric selection in the case of the robust beam management mode 2.

Referring to FIG. 11, the quality measurement is performed based on whether the measurement metric is 0 or 1. Specifically, in the case of measurement metric 1, the quality measurement is performed in single RS for each BPL (1170). In the case of measurement metric 2, the quality measurement is performed on multi-BPL in single RS.

Beam Failure Recovery Request (RR) Channel

When performing the single/multi-BPL transmissions for the control channel in the system (not limited to multi-BPL), the PRACH-like channel and the PUCCH received by allowing the base station to sweep in all directions may be used to receive the RR for the BPL upon the occurrence of the failure. What channel the base station will use may be configured in the terminal by higher layer signaling. In other words, only the PRACH-like channel may be utilized or both channels may be utilized.

Beam Failure Detection RS

If the system performs the single/multi-BPL transmission for the control channel (not limited to the multi-BPL), the synchronization signal (SS) block and/or CSI-RS or the like may be used to detect the failure of the specific BPL. In particular, to detect the failure of the specific BPL, the terminal measures the demodulation reference signal (DMRS) of the PDCCH transmitted in the specific BPL and the quasi-co-located (QCLed) SS block and/or CSI-RS. A signal-to-interference-plus-noise ratio (SINR)-like metric or L1-RSRP can be used as the measurement metric. That is, if the SINR-like metric or the L1-RSRP for the specific BPL among the BPLs that the terminal is monitoring drops below a predetermined threshold, it can be defined that the failure of the corresponding BPL occurs. It is possible to be specified in the standard that the terminal detects beam failure based on which RS among the SS block, the CSI-RS or the SS block+CSI-RS, or the base station may configure it through the higher layer signaling. The configuration of the base station may select one of the three methods described above, or may select one of some methods (e.g., SS block or CSI-RS).

In particular, if the base station configures the beam failure detection RS, the threshold for beam failure detection may be different. For example, the beam failure of the specific monitoring BPL referenced by SS block is detected when the L1-RSRP of the monitoring BPL is smaller than the Ta, and the beam failure of the specific monitoring BPL referenced by CSI-RS may be detected when the L1-RSRP of the monitoring BPL is smaller than Tb. Also, when considering both of the SS block and the CSI-RS, the beam failure of the specific monitoring BPL may be detected when the L1-RSRP is smaller than Tc. In this case, the values Ta, Tb, and Tc may be specified in the standard or the base station may configure the values Ta, Tb, and Tc through higher layer signaling.

New Candidate Beam Identification RS

If the system performs the single/multi-BPL transmission for the control channel (not limited to the multi-BPL), the SS block and/or CSI-RS or the like may be used to select the alternative BPL of the specific failure occurrence BPL(s). New candidate beam identification RS for finding the alternative BPL of the failure occurrence BPL(s) may be designated in the standard or may be configured in the base station. The terminal may select the alternative BPL of the failure occurrence BPL(s) by the L1-RSRP measurement of the new candidate beam identification RS. Whether to use the SS block, the CSI-RS, or both of the SS-block and the CSI-RS as the new candidate beam identification RS may be designated in the standard or may be configured in the base station through the higher layer signaling. The configuration of the base station may select one of the three methods described above, or may select one of some methods (e.g., SS block or CSI-RS).

In particular, if the base station is configured to use both RSs, the base station may issue an instruction to perform a search by allocating priority to which of the two RSs. For example, if the base station allocates the priority for the use of the CSI-RS, the terminal may perform the SS block review after reviewing CSI-RS for new beam identification.

The threshold for the new beam identification may be changed depending on which RS is used for the new beam identification. For example, if the new beam identification is performed based on the SS block, a new candidate beam can be selected when the L1-RSRP of the specific BPL is greater than Ta, if the new beam identification is performed based on the CSI-RS, the candidate beam may be selected when the L1-RSRP is greater than Tb, if both of the SS block and the CSI-RS are used to perform the new beam identification, the terminal may use different threshold values depending on which RS is used for performing the new beam identification (i.e., finding a new beam) (e.g., Tc based on the SS block, Td based on the CSI-RS). That is, if a new beam is preferentially searched in the CSI-RS configured in the terminal, the new candidate beam may be selected when the L1-RSRP of the specific BPL is greater than Tc, but if the new beam is not searched based on the CSI-RS, the SS block may be searched. At this time, if the L1-RSRP of the specific BPL is greater than Td, the new candidate beam is selected. The values Ta, Tb, Tc, and Td may be specified in the standard or the base station may configure the values Ta, Tb, Tc, and Td through higher layer signaling.

Period of Beam Failure Detection RS and New Candidate Beam Identification RS

When the system performs the single/multi-BPL transmission for the control channel (not limited to multi-BPL), as described above, the SS block, the CSI-RS, or the SS block and the CSI-RS may be used as the beam failure detection RS and/or the new candidate beam identification RS. When the SS block and the CSI-RS are used for the beam failure detection and/or the new candidate beam identification, the base station may configure each period through the higher layer signaling. For example, if the SS block is used for the new candidate beam identification, the base station may configure the period of the SS block for new candidate beam identification to be 20 milliseconds (ms). This configuration value may also be interpreted as the period of the SS block for the beam management. In another embodiment, when the SS block is used for the beam failure detection and new candidate beam identification, the SS block periods for the beam failure detection and the new candidate beam identification may be set to be one configuration (common period) or to different values. In another embodiment, when the CSI-RS is used for the beam failure detection and new candidate beam identification, the CSI-RSs periods for the beam failure detection and the new candidate beam identification may be set to be one configuration (common period) or to different values.

In another embodiment, the terminal may assume the SS block period as a specific value upon the beam failure detection and/or the new candidate beam identification. For example, if the SS block is used for the new candidate beam identification, the terminal may assume a 20 ms period when receiving the SS block for the new candidate beam identification.

Beam Failure RR Triggering Condition

In the system where the multi-BPL is monitored, performing the beam RR by the terminal is triggered if one of the following conditions is satisfied.

1) When the failure occurs for all the multi-BPLs that the terminal is monitoring and at least one alternative beam (i.e., new candidate beam) is found 2) A failure occurs for some of the multi-BPLs that the terminal is monitoring. One or more alternative beams are not necessarily found. In particular, at this time, the beam, in which the failure does not occur, among the monitoring BPLs are not considered as an "alternative beam" for the failure occurrence beam.

3) A failure occurs for some of the multi-BPLs that the terminal is monitoring, and one or more alternative beam is found for the BPL in which at least one failure occurs. In particular, at this time, the BPL, in which the failure does not occur, among the monitoring BPLs are considered as an "alternative beam" for the failure occurrence beam.

In particular, the conditions 2) and 3) are divided according to the meaning of the "alternative beam" defined in the standard, meaning that the terminal may report the failure occurrence BPL to the base station even when only a part of the entire monitoring BPL fails.

Alternatively, the above-described beam RR performance triggering condition may be applied only when the specific channel is used. For example, a scheme of performing the beam failure RR using the PRACH-like channel only when the condition 1) is satisfied, or performing the beam failure RR using the PUCCH if the condition 2) or the condition 3) is satisfied is possible.

PRACH-Like Recovery Request Resource Association

If the system performs the single/multi-BPL transmission for the control channel (not limited to the multi-BPL), the PRACH-like recovery request resource may be associated with the SS block or the CSI-RS. Alternatively, the PRACH-like recovery request resource may be associated with the SS block and the CSI-RS. The PRACH-like recovery request resource selected by the terminal is at least associated with the transmission beam for the base station to transmit a response to the recovery request. That is, the base station may select the transmission beam to transmit the response through the resource information in which the terminal transmits the recovery request, and the terminal may receive a response by a reception beam corresponding to the transmission beam. Also, the terminal may transmit the preferred alternative BPL information for replacing the failure BPL according to the PRACH-like recovery request resource in which the terminal performs the recovery request.

Association of PRACH-Like Recovery Request Resource with New Candidate Beam Information When the system performs the single/multi-BPL transmission for the control channel (not limited to multi-BPL), the resource (time/frequency/sequence) selected by the terminal at the time of the RR is at least to designate the transmission beam for the base station to perform the response to the RR. Alternatively, the resource selected by the terminal at the time of RR may include the preferred BPL information for the terminal to replace the failure occurrence BPL, while designating the transmission beam for the base station to perform the response to the RR.

Figure 12:
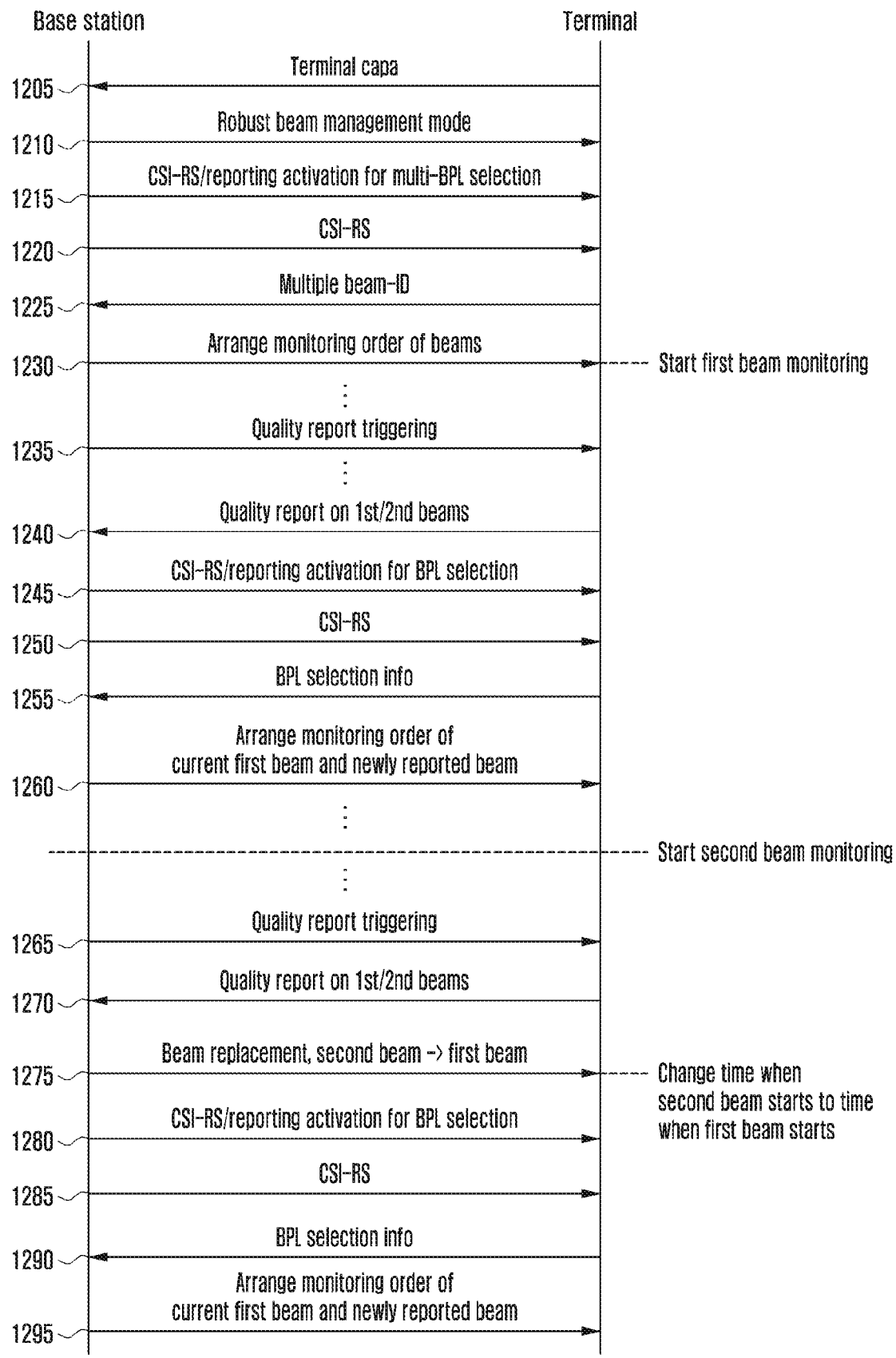
FIG. 12 shows an embodiment of the overall beam recovery request procedure when the terminal performs the mode 1 and when two control channel transmission BPLs are monitored for the robust beam management.

FIG. 12 shows an embodiment of the overall beam recovery request procedure when the terminal performs the mode 1 and when two control channel transmission BPLs are monitored for the robust beam management.

As described above, there is shown a multi-monitoring BPL setup process between the base station and the terminal for performing the multi-BPL monitoring after the terminal initial access. Based on information on the number of the concurrent beam reception that the terminal transmits at operation 1205, the base station transmits the robust beam management mode and the measurement metric through the UE-specific RRC signaling at operation 1210. Also, the base station may also inform the terminal about how many BPLs are monitored for the robust beam management mode. According to this value, the terminal may know how many preferred BPL information should be reported. In the case of the mode 1, the base station may also inform the terminal of the monitoring rule. For example, when the two BPLs are monitored, it may be inform how often two BPLs are changed and used. For example, if BPL A and BPL B are each used alternately over 8 slots and 2 slots, the DL and UL transmission may be made in A BPL from a next slot to the eighth slot based on a slot where the DCI confirming the multi-BPL is transmitted, and the DL and UL transmission to the B BPL may be made during the next slot No. 2. After the UE-specific RRC signaling, the base station may activate the CSI-RS and the reporting for the corresponding CSI-RS through the DCI so that the terminal may select the preferred multi-BPL at operation 1215. In this case, the beam used to transmit the DCI may be the base station transmission beam corresponding to the preferred BPL that the terminal reports during the initial access process, or the base station transmission beam transmitted by allowing the terminal to select the RACH resource during the initial access process. Thereafter, if the CSI-RS activated by the base station is transmitted at operation 1220, the terminal selects and reports the preferred BPL based on the measurement performed by the corresponding CSI-RS at operation 1225. Thereafter, the base station carries the ID (or CSI-RS port number) for the monitoring beams determined based on the terminal reporting and the information on the order on the DCI at operation 1230. In this case, the beam used to transmit the DCI may be the base station transmission beam corresponding to the preferred BPL that the terminal reports during the initial access process, or the base station transmission beam transmitted by allowing the terminal to select the RACH resource during the initial access process. Based on this point, the monitoring for a first (dominant) BPL starts.

If the beam failure of other monitoring BPL(s) is determined in the period in which the monitoring is continued in a first BPL and the base station triggers the quality report of the monitoring BPL through the DCI at operation 1235, the terminal may perform the quality report of the monitoring BPL through the UCI or the MAC-CE at operation 1240. In this case, when the periodic beam management RS is transmitted, the terminal can feed back the preferred BPL, which can replace the location of the observed BPL with beam failure. However, if the periodic beam management RS is not transmitted or the beam management RS is unsuitable for selecting the fine beam, then the base station may transmit the DCI through the first BPL and activate the CSI-RS and the corresponding reporting to select the new BPL at operation 1245. Through the CSI-RS reception at operation 1250, the terminal reports the new BPL information to fill the location of the failure beam at operation 1255. If a new order needs to be re-established between the current first BPL and the newly reported BPL under the base station determination, the DCI may arrange the order and inform the order at operation 1260. If the next 2nd BPL monitoring timing starts, the monitoring starts in a second BPL in the updated BPL lists at the second BPL monitoring timing.

If the failure of the first BPL is detected during the monitoring of the BPL other than the BPL having the first priority or during the connection of the first BPL and if the base station triggers the quality report by the DCI transmitted in the second BPL at operation 1265, the terminal may transmit the quality report of the BPL, which is monitoring, through the UCI or the MAC-CE at operation 1270. In this case, when the periodic beam management RS is transmitted, the terminal can feed back the preferred BPL, which can replace the location of the observed BPL with beam failure. However, if the periodic beam management RS is not transmitted or the beam management RS is unsuitable for selecting the fine beam, then the base station may transmit the DCI through the second BPL and activate the CSI-RS and the corresponding reporting to select the new BPL at operations 1280 and 1285. If the terminal notifies the failure of the first BPL through the UCI, the base station immediately changes the currently connected BPL to the first BPL. It is possible to start new monitoring on the assumption that the second BPL is the first BPL based on the timing at which it confirms that the second BPL has been changed to the first BPL through DCI. Alternatively, it is also possible to look at the second BPL for the first BPL monitoring period based on the timing at which the second BPL monitoring starts originally. Through the CSI-RS reception, the terminal reports the new BPL information to fill the location of the failure beam. If a new order needs to be re-established between the current first BPL and the newly reported BPL under the base station determination, the DCI may arrange the order and inform the order at operation 1295. If the next 2nd BPL monitoring timing starts, the monitoring starts in the second BPL in the updated BPL list at the second BPL monitoring timing.

According to another embodiment, when the failure of the BPL currently connected to the base station is detected, if the terminal may have the opportunity to use the beam recover request resource during the monitoring of the BPL currently connected to the base station (if the beam recovery request resource is defined during the monitoring interval), the terminal may notify the failure of the corresponding BPL through the RR resource. Thereafter, to fill the location of the failed BPL, a new BP may be reported. Therefore, the base station may confirm the updated BPL list information to the terminal through the RRC or the MAC-CE or the DCI.

An embodiment of the sub-divided beam recovery request procedure when the terminal performs the mode 1 and when two control channel transmission BPLs are monitored for the robust beam management is shown in FIGS. 13 to 19. In FIGS. 13 to 19, when ordering the failure BPL information transmission of the terminal and the monitoring BPL(s) of the base station, the information about the ID re-established for the monitoring BPLs other than the ID of the beam associated with the actual CSI-RS or the like may be included.

Figure 13:
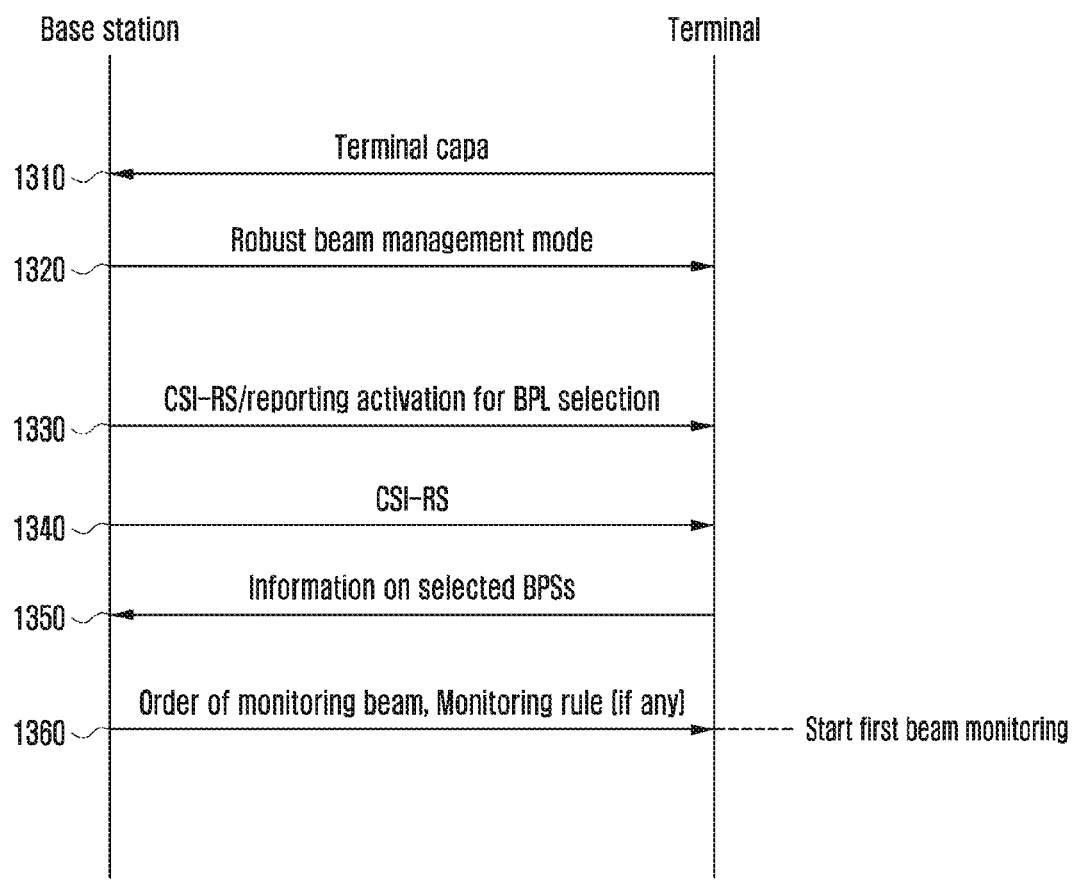
FIG. 13 shows a multi-BPL monitoring setup process between the base station and the terminal for performing the multi-BPL monitoring after the terminal initial access.

Multi-Monitoring BPL Setup Between Base Station and Terminal for Performing Multi-BPL Monitoring FIG. 13 shows a multi-BPL monitoring setup process between the base station and the terminal for performing the multi-BPL monitoring after the terminal initial access. Based on the concurrent beam reception number information that the terminal transmits, the base station transmits the robust beam management mode and the measurement metric through the UE-specific RRC signaling at operation 1310. Also, the base station may also inform the terminal about how many BPLs are monitored for the robust beam management mode at operation 1320. According to this value, the terminal may know how many preferred BPL information should be reported. In the case of the mode 1, the base station may also inform the terminal of the monitoring scheme. For example, when the two BPLs are monitored, it may be inform how often two BPLs are changed and used. For example, if BPL A and BPL B are each used alternately over 8 slots and 2 slots, the DL and UL transmission may be made in A BPL from a next slot to slot No. 8 based on a slot where the DCI confirming the multi-BPL is transmitted, and the DL and UL transmission may be made in B BPL during the next slot No. 2. After the UE-specific RRC signaling, the base station may activate the CSI-RS and the reporting for the corresponding CSI-RS through the DCI or the MAC-CE so that the terminal may select the preferred multi-BPL at operation 1330. In this case, the beam used to transmit the DCI or the MAC-CE may be the base station transmission beam corresponding to the preferred BPL that the terminal reports during the initial access process, or the base station transmission beam transmitted by allowing the terminal to select the RACH resource during the initial access process. Thereafter, if the CSI-RS activated by the base station is transmitted at operation 1340, the terminal selects and reports the preferred BPL based on the measurement performed by the corresponding CSI-RS at operation 1350. Thereafter, the base station carries the ID (or CSI-RS port number) for the monitoring beams determined based on the terminal reporting and the information on the order on the DCI or the MAC-CE at operation 1360. In this case, the beam used to transmit the DCI or the MAC-CE may be the base station transmission beam corresponding to the preferred BPL that the terminal reports during the initial access process, or the base station transmission beam transmitted by allowing the terminal to select the RACH resource during the initial access process. Based on this point, the monitoring for a first (dominant) BPL starts.

Beam Failure Recovery by Base Station BPL Quality Reporting Request

Figure 14:
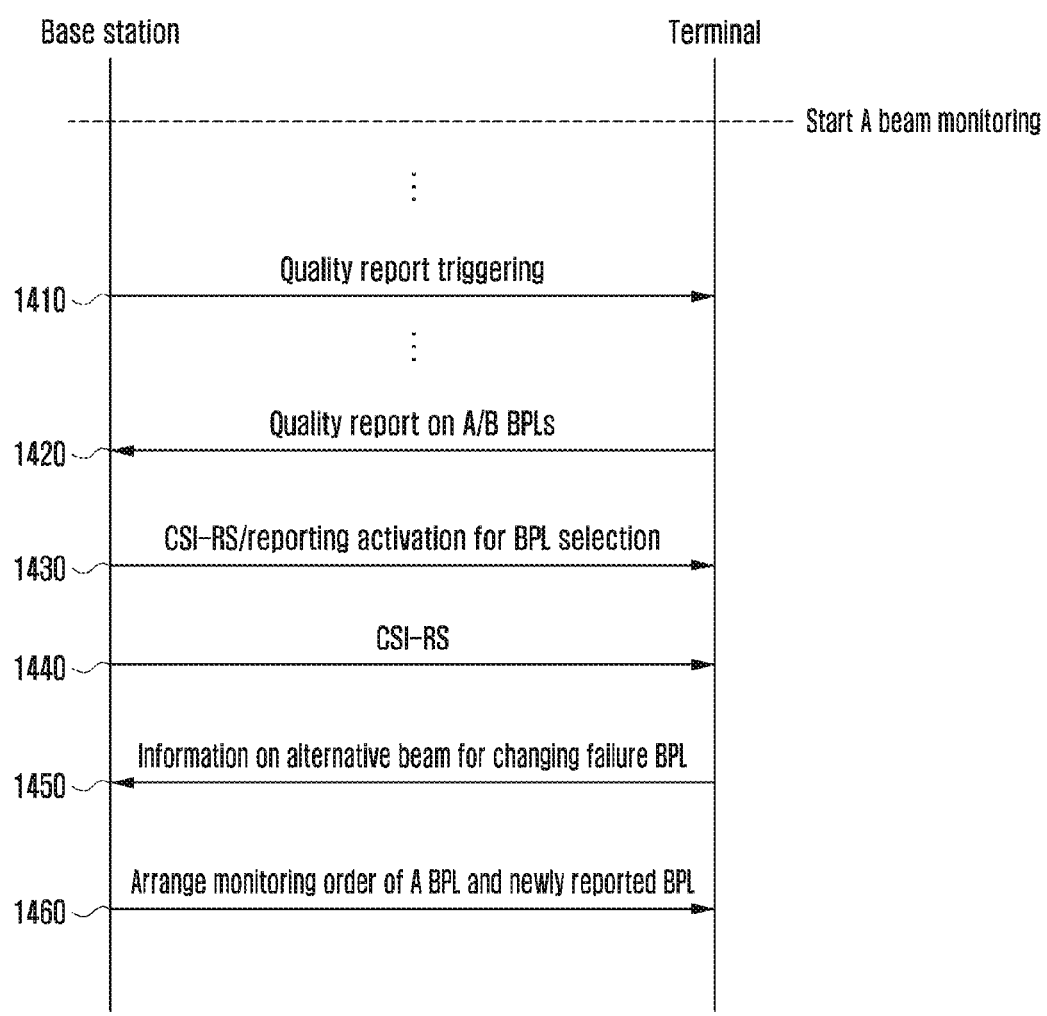
FIG. 14 shows an RR process of the B BPL during the A BPL monitoring.

FIG. 14 shows an RR process of the B BPL during the A BPL monitoring when the RR is performed upon the BPL quality reporting request of the base station, when the two BPLs are monitored, and when the SS block (i.e., composite beam) is used for the new beam identification purpose. If the base station triggers the quality reporting to the terminal through the BPL on one of the RRC/DCI/MAC-CE at operation 1410, the terminal may transmit the RSRP information (which is to include the failure information on the B BPL) for the A/B BPL and the information for the preferred composite beam at operation 1420. Alternatively, the ID that can be distinguished for the A/B BPL can be used to transmit the information on the ID of the BPL, the RSRP of BPL, and the preferred composite beam. The information on the preferred composite beam means that the selected beam ID or the port ID based on the SS block may refer to the resource ID. The reason for transmitting the same is to allow the terminal to choose a new fine BPL for updating the failure occurrence BPL (B BPL) (i.e., to refine the beam selected based on the SS block). It is also possible to transmit a plurality of preferred composite beam information from the terminal to the base station. In this case, it is helpful to find whether there is better BPL for the A BPL while reviewing the alternative beam for the B BPL in which the failure occurs.

The base station may activate and transmit the CSI-RS using one of the RRC/DCI/MAC-CE based on the information on the composite beam(s) transmitted by the terminal at operation 1430, and the terminal may transmit the alternative BPL information for changing the failure BPL (B BPL) through one of the UCI/MAC-CE at operation 1450 based on the CSI-RS receiving value at operation 1440. Alternatively, the alternative BPL information for changing the failure BPL (B BPL) and the BPL information for updating the A BPL may be included. At this time, the alternative BPL for the B BPL may be A BPL. The base station receiving the information may rearrange the monitoring order for the A BPL and the reporting BPL received from the terminal through one of the RRC/DCI/MAC-CE at operation 1460. Alternatively, the terminal may inform the terminal of the alternate BPL information for changing the failure BPL (B BPL) and the A BPL through one of the RRC/UCI/MAC-CE. That is, at this time, the A/B BPL is replaced by the C/D BPL. The monitoring order of the C/D BPL may be notified to the terminal through one of the RRC/DCI/MAC-CE. At this time, the monitoring period of the C/D may be kept the same as the monitoring period of A/B. Alternatively, if necessary, the base station may change the monitoring period of the monitoring BPLs to the terminal through one of the RRC/DCI/MAC-CE.

According to another embodiment, when instead of the SS block, the CSI-RS is used for the new beam identification, the terminal may report the beam/port/resource ID for replacing B or A/B selected based on the CSI-RS, not the beam/port/resource ID selected based on the SS block upon the quality reporting for the monitoring BPLs. In this case, after receiving the BPL information reported to the terminal, the base station may perform the alternative BPL confirmation, the order re-established or the like for the B or the A/B BPL through one of the RRC/MAC-CE/DCI.

According to another embodiment, when the SS block is used for new beam identification, as in the embodiment illustrated in FIG. 13, the terminal may report the beam/port/resource ID for replacing B or A/B selected based on the SS block at the time of the quality reporting for the monitoring BPLs, and then immediately re-establish the alternative confirmation and the order for B or A/B BPL through one of the RRC/MAC-CE/DCI without performing the fine beam association process through the CSI-RS transmission. After the recovery procedure, the base station may further perform the refinement for the updated monitoring BPLs if necessary.

Beam Failure Recovery Using PRACH-Like Channel (PRACH-Like RR Region)

Figure 15:
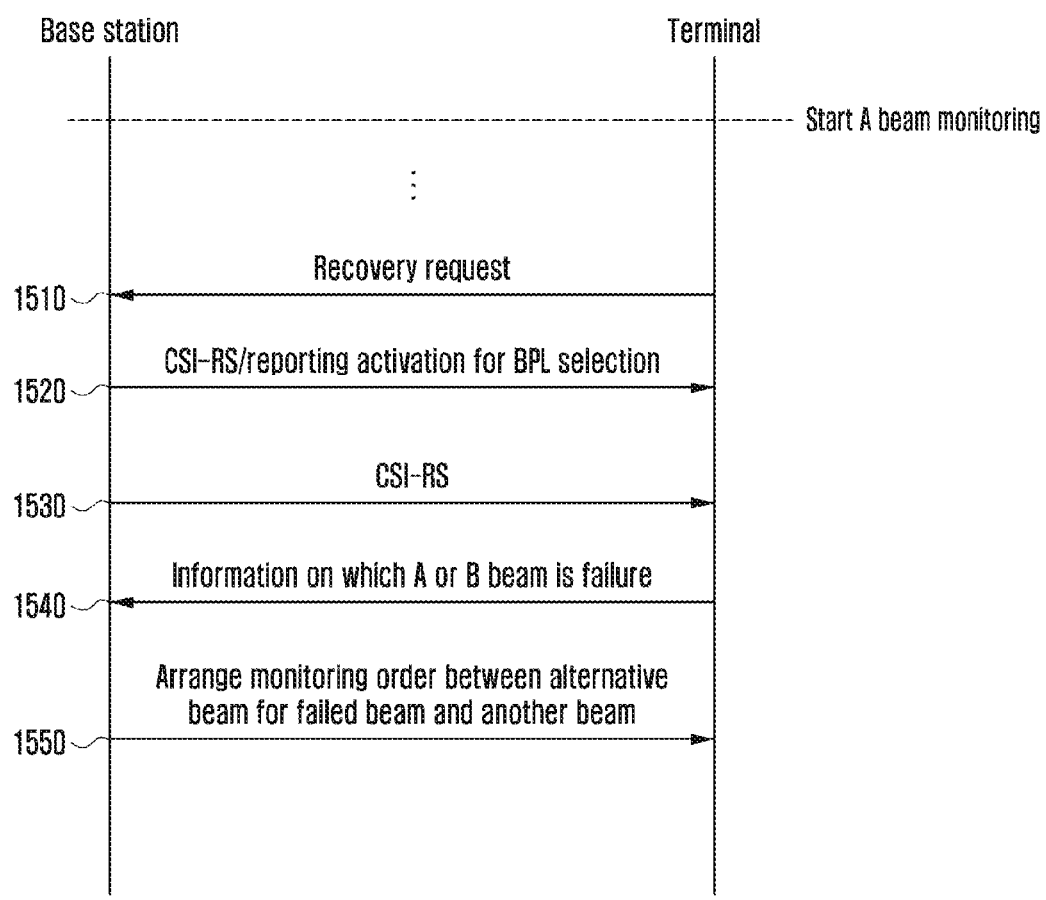
FIG. 15 shows an embodiment of the PRACH-like RR region utilization RR process for the B BPL during the A BPL monitoring.

FIG. 15 shows a first embodiment of the PRACH-like RR region utilization RR process for the B BPL during the A BPL monitoring when two BPLs are monitored and the PRACH-like channel is associated with SS blocks. The terminal transmits the RR message in the PRACH-like RR region at operation 1510. Thereafter, any BPL of the A/B BPL may transmit the alternative BPL information together with the information of the failure occurrence BPL through one of the UCI/MAC-CE at operation 1540. Alternatively, if both A/B BPL failures occur, the alternative BPLs for both BPLs may be reported. The alternative BPL information may include a resource/beam/port ID associated with the CSI-RS transmitted by the base station after the terminal recovery request. The CSI-RS transmitted by the base station after the terminal recovery request may be associated with the recovery request selection resource of the terminal. For example, if the terminal performs the RR through the PRACH-like RR resource associated with SS block #1, the base station may download, to the terminal, the fine beam in the direction associated with the SS block #1 beam direction. However, this is not limited to a standard as a base station implementation. Therefore, the base station may transmit the beam (or BPL) ID and monitoring order information for the alternate BPL(s) through one of the RRC/DCI/MAC-CE at operation 1550.

According to another embodiment, if the PRACH-like channel is associated with the SS block and the CSI-RS, the terminal may determine whether to transmit the CSI-RS for the refinement depending on whether to perform the recovery request in the PRACH-like resource associated with the SS block or whether to perform the recovery request in the PRACH-like resource associated with the CSI-RS. For example, if the terminal performs the recovery request in the PRACH-like resource associated with the SS block, the base station may activate the CSI-RS for the terminal to find the fine beam to replace the failure occurrence BPL.

Figure 16:
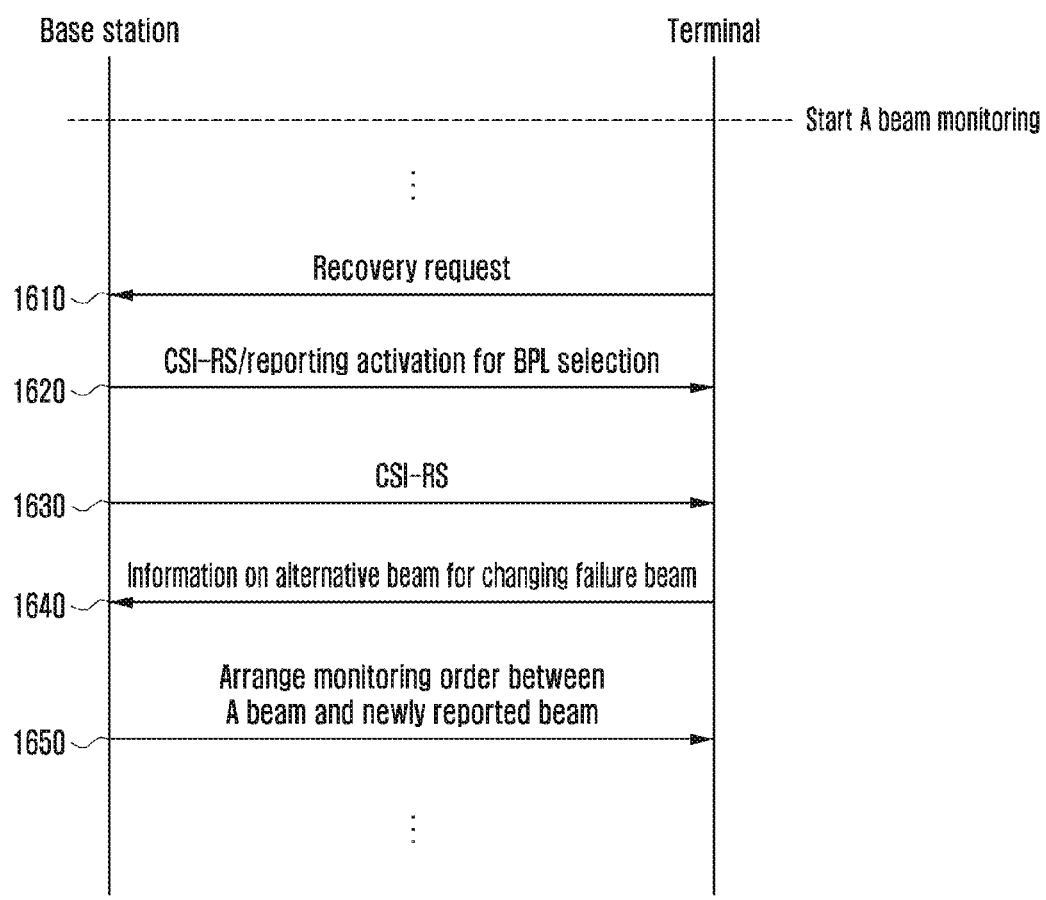
FIG. 16 shows an embodiment of the RR region utilization RR process for the B BPL during the A BPL monitoring.

FIG. 16 shows a second embodiment of the RR region utilization RR process for the B BPL during the A BPL monitoring when two BPLs are monitored and the PRACH-like channel is associated with SS blocks. When transmitting the RR in the PRACH-like RR region, the terminal transmits information on whether the failure occurrence BPL is A or B. This can be divided into resources (frequency/time/sequence, or the like). Alternatively, the terminal may transmit a situation in which all of the A/B BPLs have failed upon transmitting the RR message. In this embodiment, the terminal can report the information on the BPL(s) to replace the failed BPL(s) through the UCI/MAC-CE. Therefore, the base station may transmit one of the beam (or BPL) ID and monitoring order information for the alternate BPL(s) through one of the RRC/DCI/MAC-CE.

According to another embodiment, even when the PRACH-like channel is associated with the SS block and the CSI-RS, the information on whether the failure occurrence beam is A or B can be transmitted through the recovery request. This can be divided into resources (frequency/time/sequence, or the like). Alternatively, the terminal may transmit a situation in which all of the A/B BPLs have failed upon transmitting the RR message. The resource in which the terminal transmits the RR may indicate the alternative beam information on the failure generation beam, and if the alternative beam for the failure occurrence beam is the beam associated with the SS block (i.e., the failure situation of the specific BPL is reported in the PRACH-like channel associated with the SS block), the base station may activate the CSI-RS to perform the refinement for the corresponding BPL together.

Beam Failure Recovery when Terminal Performs Subjective RR

Figure 17:
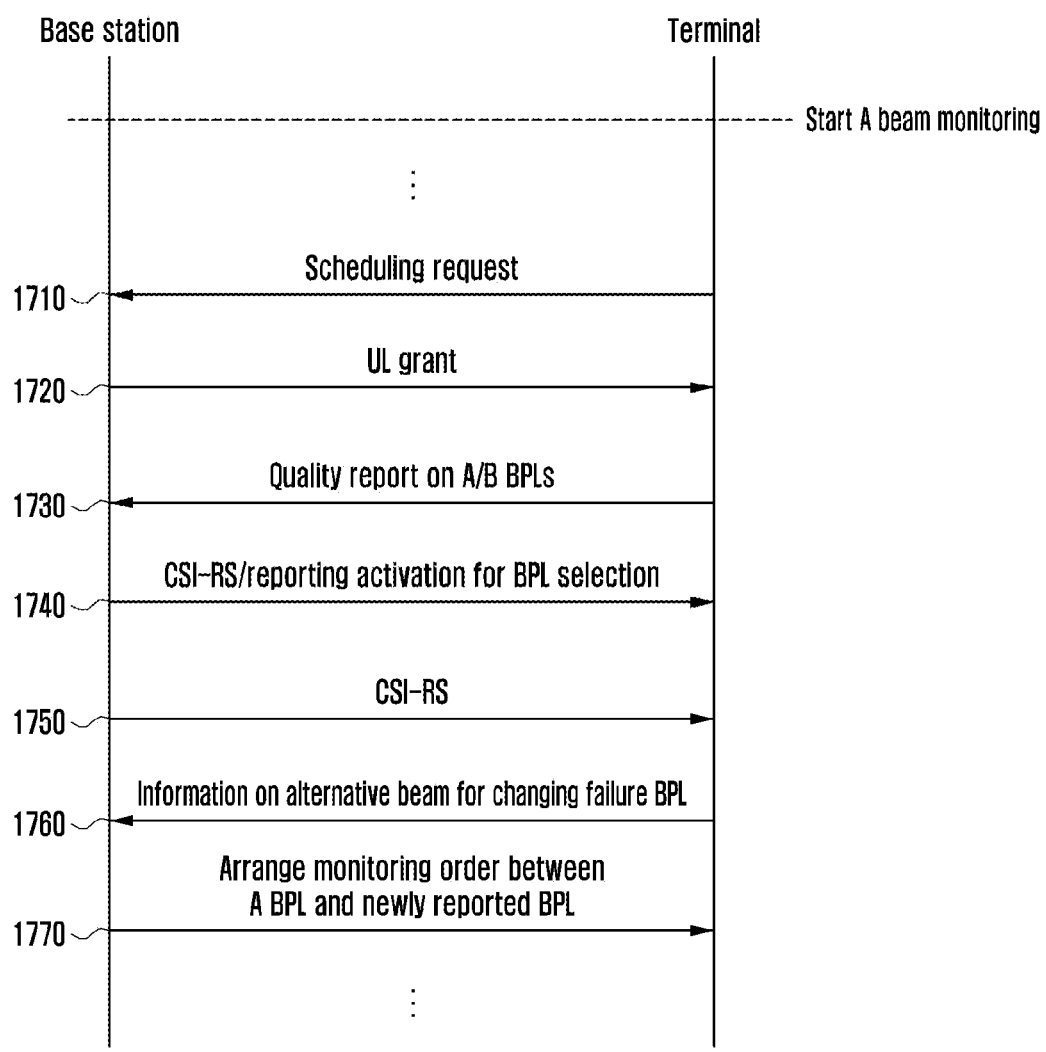
FIG. 17 shows an embodiment of the operation of the base station and the terminal operation when terminal-subjective RR is performed.

FIG. 17 shows an embodiment of the operation of the base station and the terminal operation when terminal-subjective RR is performed. In particular, FIG. 17 shows the case of performing the RR for the B BPL during the A BPL connection. As shown in FIG. 17, the terminal can perform the RR on the failure occurrence BPL in the UL resource allocated through the grant after the SR request through the periodic PUCCH. Alternatively, the terminal may immediately transmit an RR request message (including failure BPL and alternative BPL information) on the PUCCH.

Beam Failure Recovery According to New Beam Identification RS

If the SS block and the CSI-RS are used for the new beam identification RS, the (beam indication) corresponding information should include the following information when the terminal reports the alternative BPL information for the failure BPL to the base station 1) Whether the alternative BPL for the failure BPL is associated with the CSI-RS or is associated with the SS block 2) Based on the above 1), whether the alternative BPL for the failure BPL is any resource/beam/port ID For example, if the terminal finds the alternative BPL for the failure BPL in the already configured CSI-RS from the base station, the terminal transmits the BPL found by the beam based on the CSI-RS and the resource/beam/port ID information of the CSI-RS in order to inform the base station of the alternative BPL.

Beam Failure Recovery According to Beam Failure Recovery Request Triggering Condition If a beam failure RR triggering condition is defined in the condition 3 of the above-described beam failure RR triggering condition, the terminal transmits the failure occurrence information and the BPL information replacing the respective failure occurrence BPL when the failure for one or more of the monitoring BPLs occurs. At this time, the alternative BPL for each failure occurrence BPL may be the same as the BPL in which no failure occurred during the current monitoring BPLs. At this time, the alternative BPL information for the failure occurrence BPL 1) may be the CSI-RS configured in the terminal and the resource/beam/port ID based on the SS block, and 2) may be the CSI-RS configured in the terminal or the resource/beam/port ID based on the SS block or the ID of the BPL (e.g., the A/B BPL is monitored before the terminal performs the RR and indicates the ID when the ID is designated by A No. 1 and B No. 2 among the monitoring BPLs) in which the failure does not occurs among the monitoring BPLs.

That is, in the case of a system applying the above 2), the alternative BPL information for each failure occurrence BPL should include the following information: information for dividing the CSI-RI or SS block-based ID or the monitoring BPL ID and information on how many IDs the divided ID belongs to.

Figure 18:
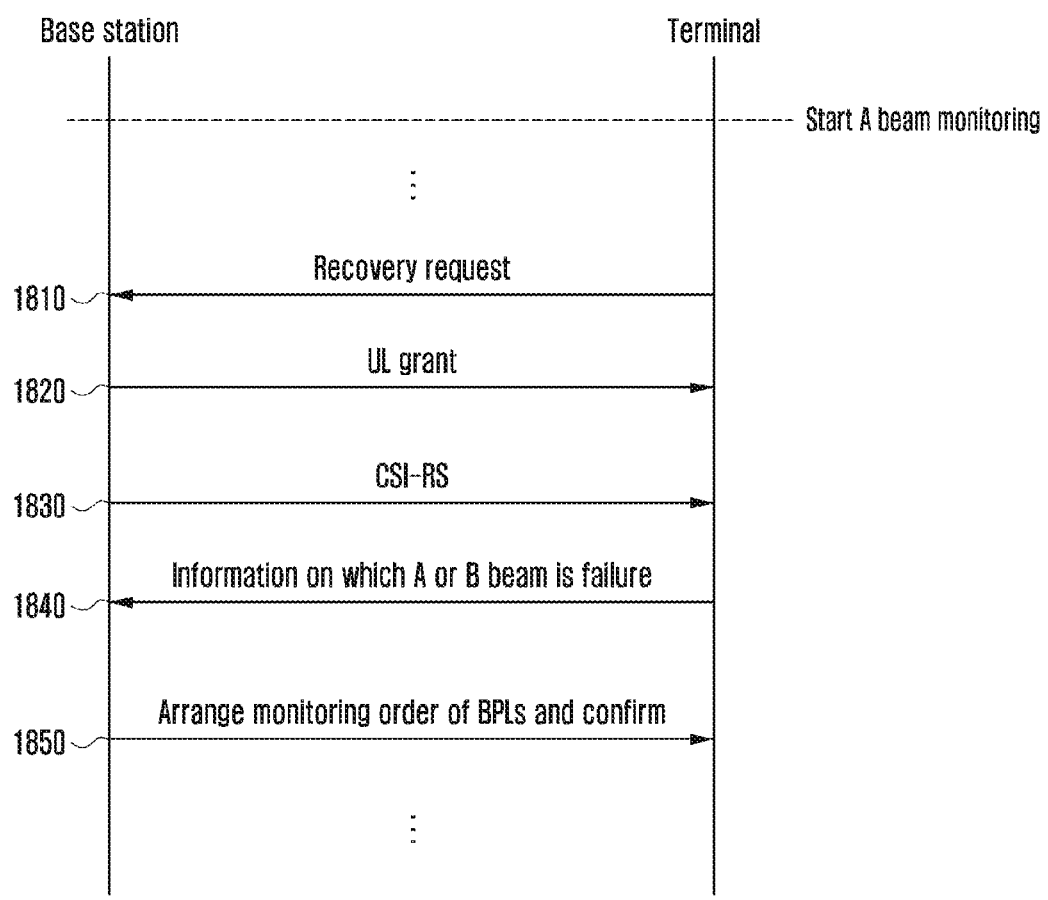
FIG. 18 shows an embodiment where the terminal performs the mode 1.

If the beam failure RR triggering condition is defined in the condition 2 of the above-described beam failure RR triggering condition, the UE does not necessarily report the alternative BPL information for the failure occurrence BPL to the base station or notify that there is no alternative BPL for the occurrence BPL. FIG. 18 shows an embodiment in which when the terminal performs the mode 1, if the beam failure RR triggering condition 2 is applied to the system, the RACH using the PRACH-like RR region utilization RR for the A/B BPL is performed during the A BPL connection. The terminal notifies the base station that the failure occurs for the specific BPL but there is no alternative beam for the corresponding failure occurrence BPL. Therefore, the base station selects one of the monitoring BPLs before the terminal performs the recovery request as the BPL information for the respective failure occurrence BPL through one of the RRC/MAC-CE/DCI.

Alternatively, in the above embodiment, when the system defines the beam failure RR triggering condition in the condition 2 of the beam failure RR triggering condition and only two BPLs are monitored, if the terminal notifies the base station that there is no alternative beam for the BPL in which the failure occurs, the base station and the terminal may be automatically connected to each other by the BPL, in which the failure does not occur, in the interval in which the base station and the terminal are connected to each other by the failure occurrence BPL The above operation is applicable even when the PRACH-like RR resource is not utilized.

Figure 19:
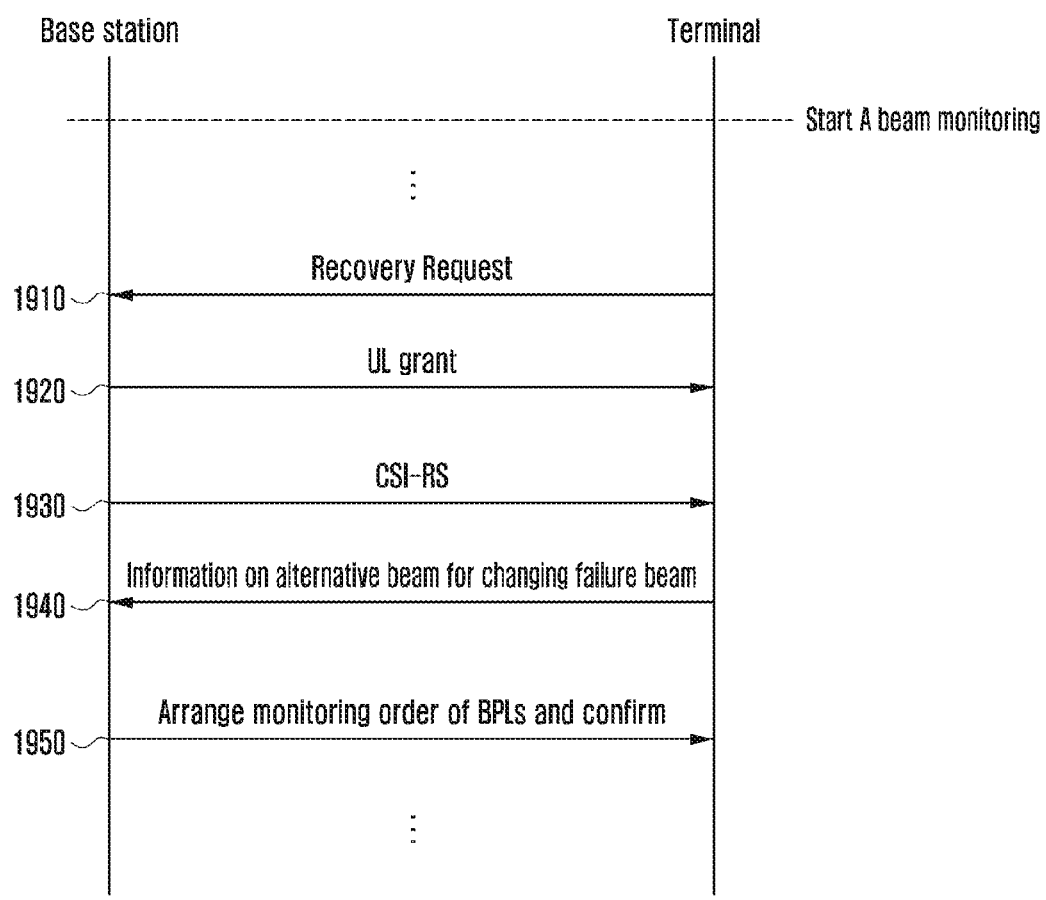
FIG. 19 shows an embodiment where the DL/UL between the base station and the terminal may be made from the response of the base station for the RR by the BPL in which the failure does not occur.

In the above embodiments, the overall beam recovery procedure is performed by the BPL corresponding to the PRACH-like RR resource in which the terminal transmits the recovery request. However, in the case in which the BPL information is immediately transmitted to the PRACH-like RR resource and two BPLs are monitored, the DL/UL between the base station and the terminal may be made from the response of the base station for the RR by the BPL in which the failure does not occurs (FIG. 19).

DL/UL Beam Designation

In the case of monitoring the multi-BPL, if the base station transmits the DCI to a DL transmission beam corresponding to a specific BPL among the BPLs included in the multi-BPL, the terminal should transmit the UCI and UL to the UL transmission beam corresponding thereto (corresponding to the same BPL). Alternatively, if the base station transmits the DCI by the DL transmission beam corresponding to the specific BPL, the terminal may instruct the DCI to transmit the UCI and UL data by the UL transmission beam (corresponding to another BPL which is being monitored) which does not correspond thereto. Here, the UL transmission beam corresponding to the beam for transmitting the DCI is not necessarily the same direction/width as the reception beam used by the terminal to receive the corresponding DCI, and the UL transmission beams for the UCI and UL data also may be the same as or different from each other.

Alternatively, for the DCI transmitted by the specific DL beam, the terminal may not necessarily transmit the UCI and UL data to the UL transmission beam corresponding thereto.

For example, in HARQ bundling of the DL data scheduled from the DCI of the plurality of monitoring BPLs, it is possible to perform UL through the BPL connected at a batch HARQ transmission time for the DCIs transmitted in different DL BPLs.

Alternatively, the system may perform HARQ bundling only on the DL data scheduled by the DCI transmitted in the same BPL.

Alternatively, in the multi-BPL monitoring situation, the system may not execute commands requiring batch processing for multi-DCI.

The base station may configure the one CORSET allocated to the terminal to have the QCL relationship with N CSI-RS resources. Alternatively, the base station may allocate, to the terminal, N CORSETs which are QCLed with one CSI-RS resource.

The terminal finds optimal reception beams for each of N CSI-RS resources to form the BPL, measures the RSRP values of the CSI-RS resource based on the BPLs formed for each CSI-RS resource, thereby determining the beam failure detection. Meanwhile, the RSRP value may be replaced by the SINR value or the RSRQ value and then applied.

The recovery request signal may be generated by combining two resources. The first resource configuring the recovery request signal may include information indicating whether the terminal detects the beam failure by measuring any of the N CSI-RS resources. The second resource configuring the recovery request signal may include information indicating the resource index of the SS-block or the resource index of the CSI-RS in which the terminal has identified the new candidate beam.

Hereinafter, to describe the embodiment, it is assumed that N=2, and the N CSI-RS resources each are defined as "A" and "B".

The first resource may indicate the information on whether the beam failure has been detected at "A", whether the beam failure has been detected at "B", or whether the beam failure has been detected at both "A" and "B". For example, for the first resource, the base station may allocate three different sequences S1, S2, and S3 to the terminal. If the terminal detects the beam failure only for "A", the terminal may use the first sequence S1 when transmitting the recovery request signal. If the terminal detects the beam failure only for "B", the terminal may use the second sequence S1 when transmitting the recovery request signal. If the terminal detects the beam failure only for "A" and "B", the terminal may use the third sequence S3 when transmitting the recovery request signal.

When the number of SS-block indexes that may be used for new beam identification is defined as T (for example, T=64), the second resource may consist of T+1. At this time, each resource may be defined by X0, X1, . . . , XT. If there is no new candidate beam newly identified by the terminal, the terminal may transmit the recovery request by selecting the resource X0. If the terminal identifies a new candidate beam by measuring the SS-block corresponding to SS-block index t, the terminal may transmit the recovery request using resource XT. The second resource may be defined by T+1 by dividing the time/frequency resource.

In the above embodiment, when the S1 sequence corresponding to the beam failure of the "A" resource is used for the recovery request transmission and the time/frequency resource location corresponding to X0 is used, it may be assumed that the terminal transmits the response of the base station for the recovery request to the CORSET that is QCLed to the "B" resource. After the predetermined time from a predetermined time when the terminal transmits the recovery request, the terminal may perform the monitoring on the CORSET to receive the response. The terminal may find the information on whether the configuration for the CORSET QCLed for the existing "A" resource is changed to the QCL for the "B" resource by receiving the response.

In the above embodiment, when the S1 sequence corresponding to the beam failure of the "A" resource is used for the recovery request transmission and the time/frequency resource location corresponding to X0 is used, it may be assumed that the terminal transmits the response of the base station for the recovery request to the CORSET that is QCLed to the "B" resource. After the predetermined time from a predetermined time when the terminal transmits the recovery request, the terminal may perform the monitoring on the CORSET to receive the response. The terminal may find the information on whether the configuration for the CORSET QCLed for the existing "B" resource is changed to the QCL for the "A" resource by receiving the response.

In the above embodiment, when the S3 sequence corresponding to the beam failure of both of the "A" and "B" resources is used for the recovery request transmission and the time/frequency resource location corresponding to XT is used, it may be assumed that the terminal transmits the response of the base station for the recovery request to the CORSET that is QCLed to the SS-block index t. After the predetermined time from a predetermined time when the terminal transmits the recovery request, the terminal may perform the monitoring on the CORSET to receive the response. The terminal may find the information on whether the configuration for the CORSET QCLed for the existing "A" and "B" resources is changed to the QCL for the SS-block index t by receiving the response.

In the above embodiment, when the S1 sequence corresponding to the beam failure of the "A" resource is used for the recovery request transmission and the time/frequency resource location corresponding to XT is used, it may be assumed that the terminal transmits the response of the base station for the recovery request to the CORSET that is QCLed to the SS-block index t. After the predetermined time from a predetermined time when the terminal transmits the recovery request, the terminal may perform the monitoring on the CORSET to receive the response. The terminal may find the information on whether the configuration for the CORSET QCLed for the existing "A" resource is changed to the QCL for the SS-block index t or is changed to the QCL for the "B" resource by receiving the response.

In the above embodiment, when the S2 sequence corresponding to the beam failure of the "B" resource is used for the recovery request transmission and the time/frequency resource location corresponding to XT is used, it may be assumed that the terminal transmits the response of the base station for the recovery request to the CORSET that is QCLed to the SS-block index t. After the predetermined time from a predetermined time when the terminal transmits the recovery request, the terminal may perform the monitoring on the CORSET to receive the response. The terminal may find the information on whether the configuration for the CORSET QCLed for the existing "B" resource is changed to the QCL for the SS-block index t or is changed to the QCL for the "A" resource by receiving the response.

Figure 20:
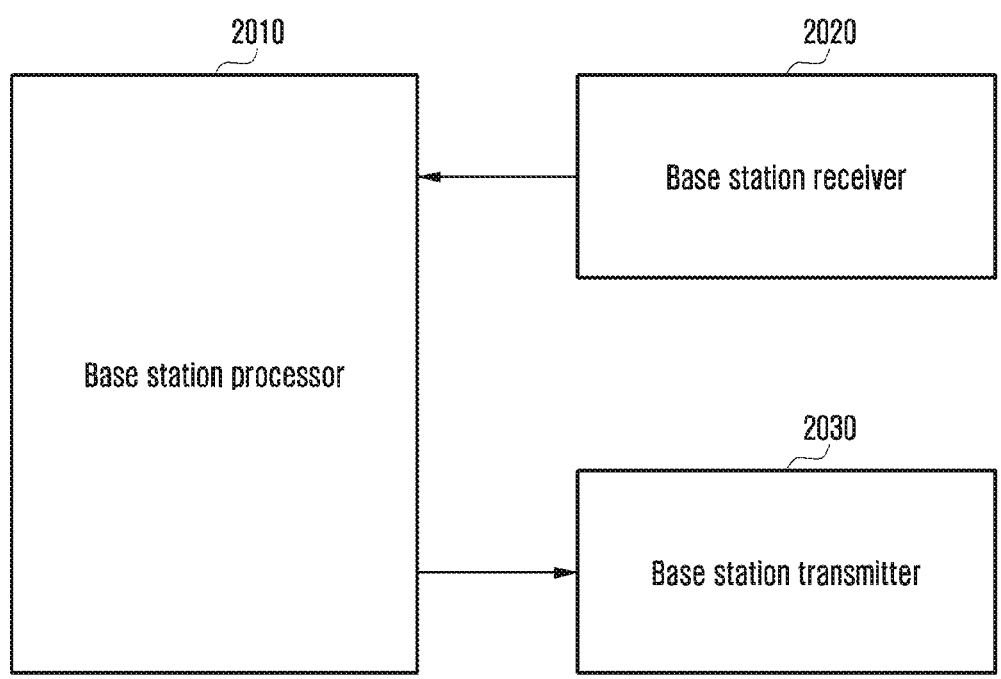
FIG. 20 illustrates a block diagram of a base station according to an embodiment of the disclosure.

FIG. 20 is a block diagram of a base station according to an embodiment of the disclosure.

Referring to FIG. 20, a base station includes a base station processor (2010), a base station receiver (2020) and a base station transmitter (2030). The base station processor (2010) may refer to a controller, a circuitry, an application-specific integrated circuit (ASIC), or at least one processor configured to perform the operations of the base station illustrated in the figures, e.g., FIGS. 1 to 19, or described above. The base station receiver (2020) and the base station transmitter (2030) are functionally coupled with the base station processor (2010) to allow the base station to communicate with other entity such as a terminal.

For example, the base station transmitter (2030) is configured to transmit a signal to a terminal. The base station processor (2010) may be configured to identify reference signals for measuring a plurality of beams and control the base station transmitter (2030) to transmit information on the reference signals to the terminal by higher layer (e.g., RRC) signaling. The information on the reference signals may indicate which type of the reference signals is used for measuring the plurality of beams. For example, the information on the reference signals indicates whether the terminal measures the plurality of beams by using SS blocks, CSI-RSs, or both the SS blocks and the CSI-RSs. In addition, the base station processor (2010) may determine a threshold for measuring the plurality of beams based on a type of the reference signals, and control the base station transmitter (2030) to transmit information on the threshold to the terminal by higher layer (e.g., RRC) signaling. The base station processor (2010) may determine the threshold for SS blocks to be different from the threshold for CSI-RSs.

Figure 21:
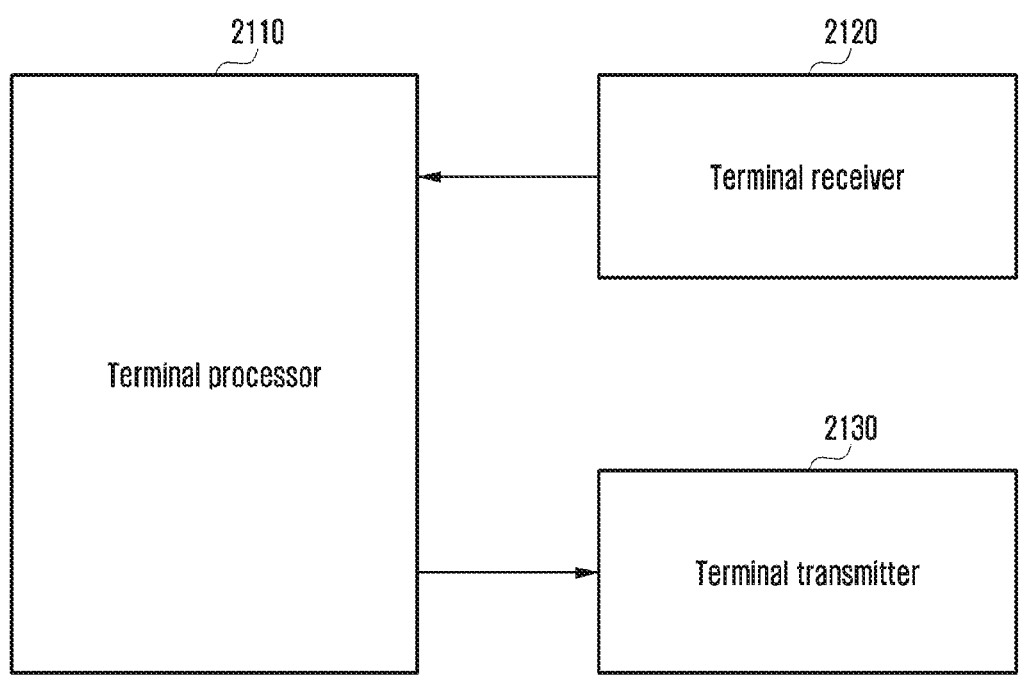
FIG. 21 illustrates a block diagram of a terminal according to an embodiment of the disclosure.

FIG. 21 is a block diagram of a terminal according to an embodiment of the disclosure.

Referring to FIG. 21, a terminal includes a terminal processor (2110), a terminal receiver (2120) and a terminal transmitter (2130). The terminal processor (2110) may refer to a controller, a circuitry, an ASIC, or at least one processor configured to perform the operations of a terminal illustrated in the figures, e.g., FIGS. 1 to 19, or described above. The terminal receiver (2120) and the terminal transmitter (2130) are functionally coupled with the terminal processor (2110) to allow the terminal to communicate with other entity such as a base station.

For example, the terminal receiver (2120) is configured to receive a signal from a base station. The terminal processor (2110) may be configured to control the terminal receiver (2120) to receive information on a reference signal from the base station by higher layer (e.g., RRC) signaling, measure a plurality beams based on the information on the reference signal, and determine at least one candidate beam among the plurality beams. The candidate beam comprises a beam quality above a threshold. The information on the reference signal may indicate which type of reference signals are used for measuring the plurality of beams. For example, the information on the reference signal indicates whether to measure the plurality of beams by using SS blocks, CSI-RSs, or both the SS blocks and the CSI-RSs. In addition, the terminal processor (2110) may control the terminal receiver (2120) to receive information on the threshold from the base station by higher layer (e.g., RRC) signaling. The threshold is associated with a type of the reference signal for measuring the plurality of beams. Specifically, the threshold for SS blocks may be different from the threshold for CSI-RSs.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal for beam failure recovery in a wireless communication system, comprising:
receiving, from a base station, configuration information including information on first reference signals identifying candidate beams for beam failure recovery and information on a threshold for determining whether a candidate beam is used for the beam failure recovery;
measuring at least one second reference signal for detecting beam failure; and
in case that the beam failure is detected:
identifying a third reference signal with reference signal received power (RSRP) above the threshold among the first reference signals;
transmitting, to the base station, a beam failure recovery request based on the third reference signal;
receiving, from the base station, an uplink grant as a response to the beam failure recovery request; and
transmitting, to the base station, a medium access control (MAC) control element (CE) including information on the third reference signal for the beam failure recovery.

2. The method of claim 1, wherein the first reference signals include at least one of a channel state information-reference signals (CSI-RS) or a synchronization signal (SS) block.

3. The method of claim 1, wherein the configuration information further includes a list of the at least one second reference signal.

4. The method of claim 1, wherein the at least one second reference signal includes at least one of a channel state information-reference signals (CSI-RS) or a synchronization signal (SS) block.

5. The method of claim 1, wherein the configuration information includes frequency information, time information, and sequence information for the beam failure recovery, and
wherein the measured at least one second reference signal is at least one of an SS block or a CSI-RS quasi-co-located with a demodulation reference signal for a physical downlink control channel (PDCCH) of the terminal.

6. A method performed by a base station for beam failure recovery in a wireless communication system, comprising:
transmitting, to a terminal, configuration information including information on first reference signals identifying candidate beams for beam failure recovery and information on a threshold for determining whether a candidate beam is used for the beam failure recovery;
transmitting, to the terminal, at least one second reference signal for detecting beam failure; and
in case that the beam failure is detected based on the at least one second reference signal:
receiving, from the terminal, a beam failure recovery request based on a third reference signal with reference signal received power (RSRP) above the threshold among the first reference signals;
transmitting, to the terminal, an uplink grant as a response to the beam failure recovery request; and
receiving, from the terminal, a medium access control (MAC) control element (CE) including information on the third reference signal for the beam failure recovery.

7. The method of claim 6, wherein the first reference signals include at least one of a channel state information-reference signals (CSI-RS) or a synchronization signal (SS) block.

8. The method of claim 6, wherein the configuration information further includes a list of the at least one second reference signal.

9. The method of claim 6, wherein the at least one second reference signal includes at least one of a channel state information-reference signals (CSI-RS) or a synchronization signal (SS) block.

10. The method of claim 6, wherein the configuration information includes frequency information, time information, and sequence information for the beam failure recovery, and
wherein the at least one second reference signal is at least one of an SS block or a CSI-RS quasi-co-located with a demodulation reference signal for a physical downlink control channel (PDCCH) of the terminal.

11. A terminal in a wireless communication system, comprising:
a transceiver; and
at least one processor coupled with the transceiver and configured to:
receive, from a base station via the transceiver, configuration information including information on first reference signals identifying candidate beams for beam failure recovery and information on a threshold for determining whether a candidate beam is used for the beam failure recovery,
measure at least one second reference signal for detecting beam failure, and
in case that the beam failure is detected:
identify a third reference signal with reference signal received power (RSRP) above the threshold among the first reference signals,
transmit, to the base station via the transceiver, a beam failure recovery request based on the third reference signal,
receive, from the base station via the transceiver, an uplink grant as a response to the beam failure recovery request, and
transmit, to the base station via the transceiver, a medium access control (MAC) control element (CE) including information on the third reference signal for the beam failure recovery.

12. The terminal of claim 11, wherein the first reference signals include at least one of a channel state information-reference signals (CSI-RS) or a synchronization signal (SS) block.

13. The terminal of claim 11, wherein the configuration information further includes a list of the at least one second reference signal.

14. The terminal of claim 11, wherein the at least one second reference signal includes at least one of a channel state information-reference signals (CSI-RS) or a synchronization signal (SS) block.

15. The terminal of claim 11, wherein the configuration information includes frequency information, time information, and sequence information for the beam failure recovery, and
wherein the measured at least one second reference signal is at least one of an SS block or a CSI-RS quasi-co-located with a demodulation reference signal for a physical downlink control channel (PDCCH) of the terminal.

16. A base station in a wireless communication system, comprising:
a transceiver; and
at least one processor coupled with the transceiver and configured to:
transmit, to a terminal via the transceiver, configuration information including information on first reference signals identifying candidate beams for beam failure recovery and information on a threshold for determining whether a candidate beam is used for the beam failure recovery,
transmit, to the terminal via the transceiver, at least one second reference signal for detecting beam failure, and
in case that the beam failure is detected based on the at least one second reference signal:
receive, from the terminal via the transceiver, a beam failure recovery request based on a third reference signal with reference signal received power (RSRP) above the threshold among the first reference signals,
transmit, to the terminal via the transceiver, an uplink grant as a response to the beam failure recovery request, and
receive, from the terminal via the transceiver, a medium access control (MAC) control element (CE) including information on the third reference signal for the beam failure recovery.

17. The base station of claim 16, wherein the first reference signals include at least one of a channel state information-reference signals (CSI-RS) or a synchronization signal (SS) block.

18. The base station of claim 16, wherein the configuration information further includes a list of the at least one second reference signal.

19. The base station of claim 16, wherein the at least one second reference signal includes at least one of a channel state information-reference signals (CSI-RS) or a synchronization signal (SS) block.

20. The base station of claim 16, wherein the configuration information includes frequency information, time information, and sequence information for the beam failure recovery, and
wherein the at least one second reference signal is at least one of an SS block or a CSI-RS quasi-co-located with a demodulation reference signal for a physical downlink control channel (PDCCH) of the terminal.

* * * * *